United States Patent
Bita

(10) Patent No.: US 9,582,200 B2
(45) Date of Patent: Feb. 28, 2017

(54) STORAGE APPARATUS, METHOD OF CONTROLLING STORAGE APPARATUS, AND COMPUTER-READABLE RECORDING MEDIUM HAVING STORED THEREIN STORAGE APPARATUS CONTROL PROGRAM

(71) Applicant: FUJITSU LIMITED, Kawasaki-shi, Kanagawa (JP)

(72) Inventor: Joichi Bita, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 193 days.

(21) Appl. No.: 14/493,441

(22) Filed: Sep. 23, 2014

(65) Prior Publication Data

US 2015/0121020 A1   Apr. 30, 2015

(30) Foreign Application Priority Data

Oct. 25, 2013 (JP) .................................. 2013-222060

(51) Int. Cl.
G06F 3/06 (2006.01)

(52) U.S. Cl.
CPC .......... G06F 3/0613 (2013.01); G06F 3/0659 (2013.01); G06F 3/0673 (2013.01); G06F 3/0689 (2013.01); G06F 2003/0697 (2013.01)

(58) Field of Classification Search
CPC .. G06F 3/0613; G06F 3/0689; G06F 11/3419; G06F 11/3485; G06F 2201/88;
(Continued)

(56) References Cited

U.S. PATENT DOCUMENTS

| | | |
|---|---|---|
| 2006/0031648 A1 | 2/2006 | Ishikawa et al. |
| 2008/0126645 A1* | 5/2008 | Yamaguchi ........... G06F 3/0613 710/117 |

(Continued)

FOREIGN PATENT DOCUMENTS

| | | |
|---|---|---|
| EP | 2608011 A1 | 6/2013 |
| JP | 2006-053601 | 2/2006 |

(Continued)

OTHER PUBLICATIONS

Extended European Search Report dated Mar. 12, 2015 for corresponding European Patent Application No. 14186171.6, 8 pages.

*Primary Examiner* — Zhuo Li
(74) *Attorney, Agent, or Firm* — Fujitsu Patent Center

(57) ABSTRACT

A storage apparatus includes a processor. The processor calculates an upper limit of an input/output processing amount, which is determined based on priority levels set to a plurality of storage devices, for each storage device. The processor schedules an execution sequence of processes relating to input/output requests received from information processing apparatuses based on processing amounts relating to the input/output requests and the upper limits. The processor executes the processes relating to the input/output requests in the scheduled execution sequence. The processor is configured to determine, for each storage device, whether or not a processing amount of the storage device exceeds a processing bandwidth of the each storage device for a first predetermined time. The processor changes the upper limit for each storage device in a predetermined bandwidth accommodation unit in a case where the processing amount for each storage device is determined to exceed the processing bandwidth.

20 Claims, 21 Drawing Sheets

(58) Field of Classification Search
CPC .......... G06F 2206/1012; G06F 3/0631; G06F 3/0653; G06F 3/0658; G06F 3/0683; G06F 3/0659; G06F 3/0673; G06F 2003/0697
See application file for complete search history.

(56) References Cited

U.S. PATENT DOCUMENTS

2009/0089458 A1* 4/2009 Sugimoto ............. G06F 3/0613
710/6
2009/0094401 A1  4/2009 Larson et al.
2013/0159557 A1  6/2013 Bita

FOREIGN PATENT DOCUMENTS

JP  2009-093636  4/2009
JP  2013-127758  6/2013

* cited by examiner

FIG. 4

| PRIORITY LEVEL | BANDWIDTH VALUE (MB/s) | BANDWIDTH VALUE (IOPS) |
|---|---|---|
| 1 | 800 | 15000 |
| 2 | 700 | 12500 |
| 3 | 600 | 10000 |
| 4 | 500 | 7500 |
| 5 | 400 | 5000 |
| 6 | 300 | 3000 |
| 7 | 200 | 1000 |
| 8 | 100 | 800 |
| 9 | 70 | 600 |
| 10 | 40 | 400 |
| 11 | 25 | 300 |
| 12 | 20 | 240 |
| 13 | 15 | 180 |
| 14 | 10 | 120 |
| 15 | 5 | 60 |

| TARGET | PRIORITY LEVEL | I/O NUMBER FOR N MILLI- SECONDS | BLOCK NUMBER FOR N MILLI- SECONDS | LIMIT I/O NUMBER | LIMIT BLOCK NUMBER | CURRENT I/O NUMBER | CURRENT BLOCK NUMBER |
|---|---|---|---|---|---|---|---|
| FC-CA 201a | 3 | 100 | 12288 | 100×n-a | 12288×n-A | a | A |
| HOST 10a | 5 | 50 | 8192 | 50×n-b | 8192×n-B | b | B |
| HOST 10b | 7 | 10 | 4096 | 10×n-c | 4096×n-C | c | C |
| HOST 10a-LUN-A | 10 | 4 | 819.2 | 4×n-d | 819.2×n-D | d | D |
| HOST 10a-LUN-B | 13 | 1.8 | 307.2 | 1.8×n-e | 307.2×n-E | e | E |
| HOST 10b-LUN-C | 15 | 0.6 | 102.4 | 0.6×n-f | 102.4×n-F | f | F |

| | HOST | LUN | ACCOMMODATION UNIT NUMBER $N_B$ |
|---|---|---|---|
| $L_0$ | HOST #1 | LUN#1 | 50 |
| $L_1$ | HOST #2 | LUN#3 | 25 |
| $L_2$ | HOST #1 | LUN#4 | 15 |
| $L_3$ | HOST #2 | LUN#2 | 10 |
| $L_4$ | HOST #2 | LUN#5 | 8 |
| ... | ... | ... | ... |

STORAGE APPARATUS, METHOD OF CONTROLLING STORAGE APPARATUS, AND COMPUTER-READABLE RECORDING MEDIUM HAVING STORED THEREIN STORAGE APPARATUS CONTROL PROGRAM

CROSS-REFERENCE TO RELATED APPLICATION

This application is based upon and claims the benefit of priority of the prior Japanese Application No. 2013-222060 filed on Oct. 25, 2013 in Japan, the entire contents of which are hereby incorporated by reference.

FIELD

The embodiment discussed herein is directed to a storage apparatus, a method of controlling a storage apparatus, and a recording medium having stored therein a storage apparatus control program.

BACKGROUND

In a storage system in which a plurality of servers (hereinafter, referred to as hosts) share one storage apparatus, there are cases where input/output processes requested from the hosts contend inside the storage apparatus, and stable performance is not be maintained for each input/output process (application). Thus, there are cases where a storage apparatus has a quality of service (QoS) function for maintaining appropriate performance according to a priority level for each input/output process by performing the process with priority levels (degree of priority) being assigned to the processing requests from the hosts.

Relating to the QoS function (storage QoS) included in a storage apparatus, a technology for allocating internal resources such as a queue and the like based on a priority level designated by a host and executing a command is known. As an example, a case will be described in which, in a storage system in which two hosts A and B share one storage apparatus, host A transmits a command with a priority level being designated thereto. When the priority level is designated from host A, for example, the storage apparatus allocates internal resources that are three times those allocated to a process to which a priority level is not designated. As a result, the storage apparatus performs an input/output process requested from host A with priority over an input/output process requested from host B.

In addition, a technology for maintaining appropriate performance according to a priority level for each input/output process (application) by setting target performance or a bandwidth limit to each host or logical unit (LU) on the storage apparatus side is known.

Furthermore, a technology for responding to a change in the load status by changing a priority level set for a specific input/output process in a case where the load status of the input/output process changes is known. For example, according to such a technology, in a case where an actual input/output processing amount is continuously below the processing bandwidth of the whole storage within a predetermined time, priority levels set to LUs of which the input/output processing amount arrives at a bandwidth limit and the like are raised by one. By raising the priority levels of the LUs and the like by one, the bandwidth limits of the LUs and the like are changed to be high. Accordingly, the performance of the LU and the like is adjusted, and a change in the load status can be responded.

[Patent Document 1] Japanese Laid-open Patent Publication No. 2006-53601
[Patent Document 2] Japanese Laid-open Patent Publication No. 2009-93636
[Patent Document 3] Japanese Laid-open Patent Publication No. 2013-127758

However, according to the above-described QoS function, in a case where the performance of the storage apparatus that is requested from the host changes, the performance adjustment (flexibility of bandwidth, bandwidth accommodation) between resources (for example, LUs) inside the storage apparatus is difficult to be performed in accordance with the change in the performance according to the circumstances.

While technologies for responding to change in the load status by changing the priority level as described above are known, in a case where the performance is adjusted by changing the priority level, there are cases where a change interval of the bandwidth limit before and after the change of the priority level is extremely large. When the change interval of the bandwidth limit is large, the adjustment range according to raising/lowering the priority level is limited, and a change in the performance requested from the host is difficult to be delicately followed, and there are also cases where the processing bandwidth of the storage apparatus is degraded.

SUMMARY

A storage apparatus according to an embodiment calculates an upper limit of an input/output processing amount, which is determined based on priority levels set to a plurality of storage devices, for each of the storage devices. In addition, the storage apparatus schedules an execution sequence of processes relating to input/output requests received from information processing apparatuses, based on processing amounts relating to the input/output requests and the calculated upper limits and executes the processes relating to the input/output requests in the scheduled execution sequence. Furthermore, the storage apparatus determines, for each of the storage devices, whether or not a processing amount relating to the input/output requests for the each of the storage devices exceeds a processing bandwidth of the each of the storage devices for a first predetermined time. In addition, the storage apparatus changes the upper limit for the each of the storage devices in a predetermined bandwidth accommodation unit in a case where the processing amount relating to the input/output requests for the each of the storage devices is determined to exceed the processing bandwidth of the each of the storage devices.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 4 is a diagram that illustrates an example of a correspondence relation between a priority level and a bandwidth value;

FIG. 18 is a diagram that illustrates an example of a accommodation destination unit array (LUN/host number array) generated in the macro accommodation restoration process according to this embodiment;

DESCRIPTION OF THE PREFERRED EMBODIMENTS

Hereinafter, a storage apparatus, a method of controlling a storage apparatus, and a computer-readable recording medium stored therein a storage control program according to an embodiment disclosed herein will be described in detail with reference to the drawings. However, the embodiment represented as below is merely an example, and there is no intention for excluding various modified examples or the application of various technologies that are not explicitly described in the embodiment. In other words, this embodiment may be variously changed in a range not departing from the concept thereof. In addition, each diagram does not represent that only constituent elements illustrated in the diagram are included, but any other function may be included therein. Furthermore, the embodiments may be appropriately combined in a range in which the contents of the processes are not contradictory.

[1] Configuration of this Embodiment

First, the configuration of this embodiment will be described with reference to FIGS. 1 to 5.

[1-1] Configuration of Storage System of this Embodiment

Figure 1:
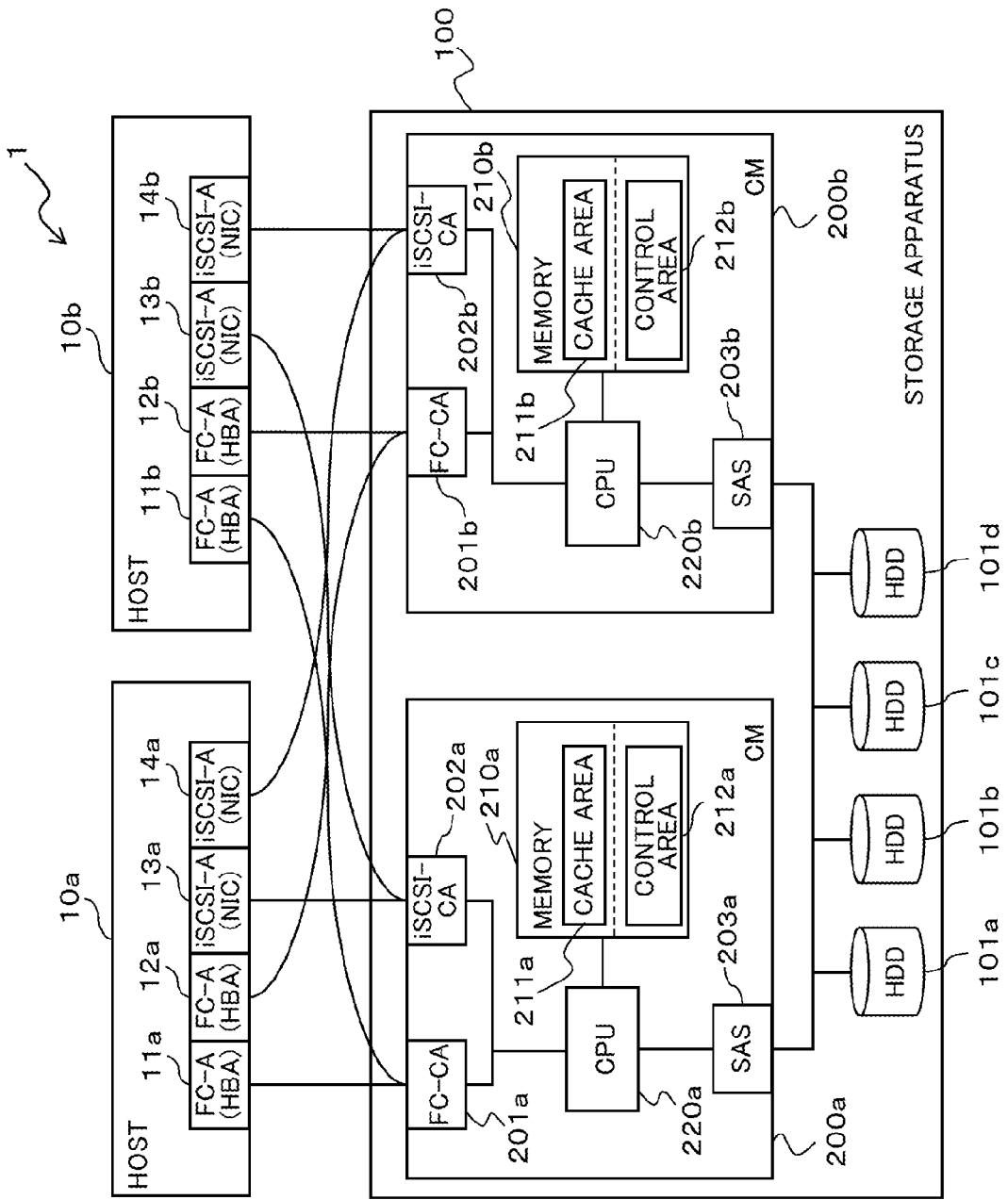
FIG. 1 is a block diagram that illustrates an example of the hardware configuration of a storage system according to this embodiment.

FIG. 1 is a diagram that illustrates an example of the configuration of a storage system 1 according to this embodiment. As illustrated in FIG. 1, the storage system 1 includes a host 10a, a host 10b, and a storage apparatus 100. In the storage system 1, the storage apparatus 100 is connected to the host 10a and the host 10b. Here, the number of hosts connected to the storage apparatus 100 is not limited to that illustrated in the figure but may be changed.

[1-2] Configuration of Host

Subsequently, the configurations of the hosts 10a and 10b will be described with reference to FIG. 1. The hosts 10a and 10b are information processing apparatuses such as servers. The host 10a includes: a fiber channel (FC)-adapter (A) 11a; a FC-A 12a; an Internet Small Computer System Interface (iSCSI)-A 13a; and an iSCSI-A 14a. The FC-A's 11a and 12b are, commonly, have the form of a FC-host bus adapter (HBA). In addition, the iSCSI-A's 13a and 14a, commonly, have the form in which an iSCSI protocol is operated by using a network interface card (NIC).

The FC-A 11a is an interface for connecting to a FC-communication adaptor (CA) 201a arranged inside a controller module (CM) 200a to be described later using an FC. In addition, similarly, the FC-A 12a is an interface for connecting to an FC-CA 201b arranged inside a CM 200b using the FC. Furthermore, the iSCSI-A 13a is an interface for connecting to an iSCSI-CA 202a arranged inside a CM 200a to be described later using the iSCSI. Similarly, the iSCSI-A 14a is an interface for connecting to an iSCSI-CA 202b arranged inside a CM 200b to be described later using the iSCSI.

The host 10b includes an FC-A 11b, an FC-A 12b, an iSCSI-A 13b, and an iSCSI-A 14b. The FC-A 11b corresponds to the FC-A 11a, and the FC-A 12b corresponds to the FC-A 12a. In addition, the iSCSI-A 13b corresponds to the iSCSI-A 13a, and the iSCSI-A 14b corresponds to the iSCSI-A 14a. In description presented below, in a case where any one of the hosts 10a and 10b is generally referred to without discriminating the host 10a and the host 10b from each other, it will be represented as a host 10.

[1-3] Configuration of Storage Apparatus According to this Embodiment

Subsequently, the configuration of the storage apparatus 100 according to this embodiment will be described with reference to FIG. 1. The storage apparatus 100 according to this embodiment includes hard disk drives (HDDs) 101a to 101d and CMs 200a and 200b.

The HDDs 101a to 101d configure redundant arrays of inexpensive drives (RAID) and store user data. The CMs 200a and 200b are storage control modules that control the entire system of the storage apparatus 100. The CMs 200a and 200b are configured to be redundant. Here, the number of HDDS and the number of CMs included in the storage apparatus 100 are not limited to those illustrated in the figure but may be changed. In addition, the storage system may be configured by mounting a plurality of CMs as storage apparatuses (storage control devices) of a controller enclosure, mounting physical disks such as HDDs in the storage apparatuses of a disk enclosure, and connecting the controller enclosure and the disk enclosure to each other.

In addition, the storage apparatus 100 is used as logical units (hereinafter, referred to as LUs) that are acquired by logically dividing the HDDs 101a to 101d (one or more physical storage devices). Each LU (storage device) is recognized by the hosts 10a and 10b as one logical HDD.

The CM 200a includes an FC-CA 201a, an iSCSI-CA 202a, a serial attached SCSI (SAS) 203a, a memory 210a, and a central processing unit (CPU) 220a.

The FC-CA 201a is an interface connecting to the hosts 10a and 10b using the FC. The iSCSI-CA 202a is an interface connecting to the hosts 10a and 10b using the iSCSI. The SAS 203a is an interface connecting to the HDDs 101a to 101d using the SAS. In description presented below, in a case where the FC-CA 201a and the iSCSI-CA 202a are generally referred to, they will be represented as ports as is appropriate.

The memory 210a, for example, is a semiconductor memory device such as a random access memory (RAM) and includes a cache area 211a and a control area 212a. The cache area 211a temporarily stores data that is exchanged between the host 10a or 10b and any one of the HDDs 101a to 101d. The control area 212a stores information for various processes performed by the storage apparatus 100. In addition, in the control area 212a, various programs and the like are stored as well. Furthermore, the control area 212a includes a QoS control area 213 (see FIG. 3) to be described later.

The CPU 220a is an electronic circuit that performs various processes such as calculation processes and control processes and is used for realizing a processing unit 300 (see FIG. 2) to be described later.

The CM 200b includes an FC-CA 201b, an iSCSI-CA 202b, a SAS 203b, a memory 210b, and a CPU 220b. The FC-CA 201b corresponds to the FC-CA 201a, the iSCSI-CA 202b corresponds to the iSCSI-CA 202a, and the SAS 203b corresponds to the SAS 203a. In addition, the memory 210b corresponds to the memory 210a, and the CPU 220b corresponds to the CPU 220a.

In such a storage system 1, the CPUs 220a and 220b of the storage apparatus 100 perform the following process by firmware. The storage apparatus 100 calculates an upper limit of the input/output processing amount that is based on priority levels set in a plurality of LUs for each LU. In addition, the storage apparatus 100 schedules the execution sequence of processes relating to input/output requests based on the processing amounts relating to input/output requests received from the host 10 and the calculated upper limit and performs processes relating to the input/output requests in the scheduled execution sequence. Then, the storage apparatus 100 determines, for each LU, whether or not the processing amount relating to an input/output request for the LU exceeds the processing bandwidth of the LU for a first predetermined time (for example, 30 seconds). In a case where the processing amount relating to the input/output request for the LU is determined to exceed the processing bandwidth of the LU, the storage apparatus 100 changes the upper limit of the LU in a predetermined bandwidth accommodation unit (bandwidth accommodation unit). In this way, the storage apparatus 100 controls the storage bandwidth to be optimal in accordance with the status of the input/output request (an I/O request or a command) transmitted from the host 10 and a change in the connection environment of the host 10. Particularly, by changing and adjusting the upper limit in the predetermined bandwidth accommodation unit, the storage apparatus 100 can delicately follow a change in the processing bandwidth requested from the host 10 and can respond to various bandwidth changes.

Here, the upper limit of the input/output processing amount, for example, is a limit I/O number or a limit block number to be described later, and the upper limit, the limit I/O number, and the limit block number may be referred to as a limit value or a bandwidth limit value.

[1-4] Functional Configuration of Processing Unit Realized by Firmware

Figure 2:
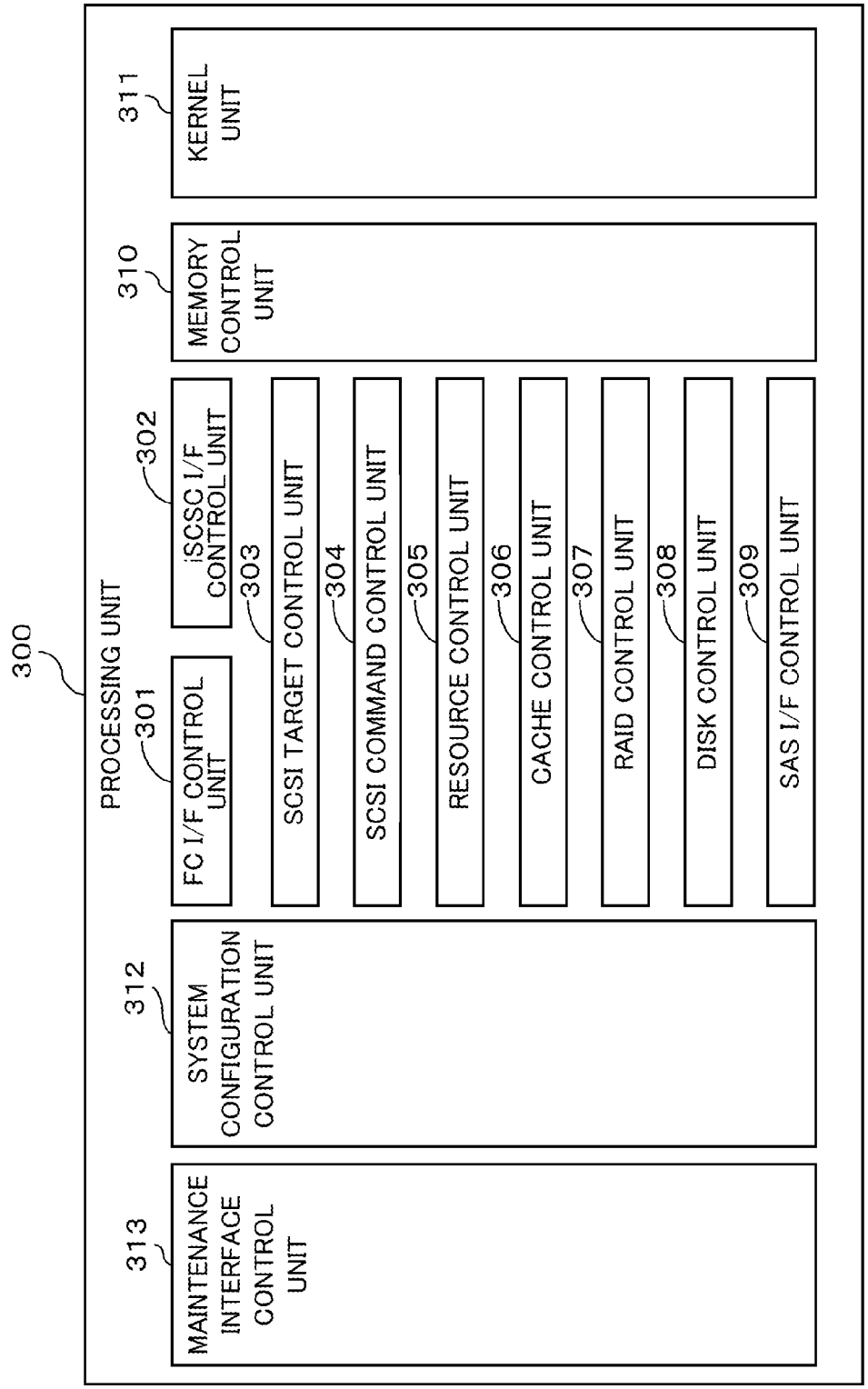
FIG. 2 is a block diagram that illustrates the functional configuration of a processing unit realized by firmware that is executed by a storage apparatus according to this embodiment.

Next, the functional configuration of a processing unit 300 that is realized by firmware executed by the storage apparatus 100 will be described with reference to FIG. 2. FIG. 2 is a block diagram that illustrates the functional configuration of the processing unit 300 realized by firmware that is executed by the storage apparatus 100. The processing unit 300 is realized by the cooperation of the memories 210a and 210b and the CPUs 220a and 220b.

As illustrated in FIG. 2, the processing unit 300 includes an FC interface (I/F) control unit 301, an iSCSI I/F control unit 302, an SCSI target control unit 303, an SCSI command control unit 304, a resource control unit 305, a cache control unit 306, and a RAID control unit 307. In addition, the processing unit 300 includes a disk control unit 308, an SAS I/F control unit 309, a memory control unit 310, a kernel unit 311, a system configuration control unit 312, and a maintenance interface control unit 313.

The FC I/F control unit 301 performs control of an FC protocol chip in a case where the host 10 is connected using the FC. The iSCSI I/F control unit 302 performs control of an iSCSI protocol chip in a case where the host 10 is connected using the iSCSI.

The SCSI target control unit 303 performs control of the SCSI target. The SCSI target control unit 303, for example, performs host management, LU management, command execution management, management of an abnormal system event other than a command, and the like. A detailed function of the SCSI target control unit 303 will be described later with reference to FIG. 3.

The SCSI command control unit 304 performs control for each type of SCSI command. The resource control unit 305 performs logical volume management, host path management, and load management across all the CMs. The cache control unit 306 manages the cache storage device. The RAID control unit 307 manages a RAID group. The disk control unit 308 performs disk command control. The SAS I/F control unit 309 performs control of a protocol chip connecting to the HDDs 101a to 101d using the SAS.

The memory control unit 310 manages a control memory that is used by each control unit. The kernel unit 311 is a basic software part and is placed at a subordinate position of each control unit. The system configuration control unit 312 manages the configuration information of the storage apparatus 100. The maintenance interface control unit 313 controls a user interface for maintenance.

Figure 3:
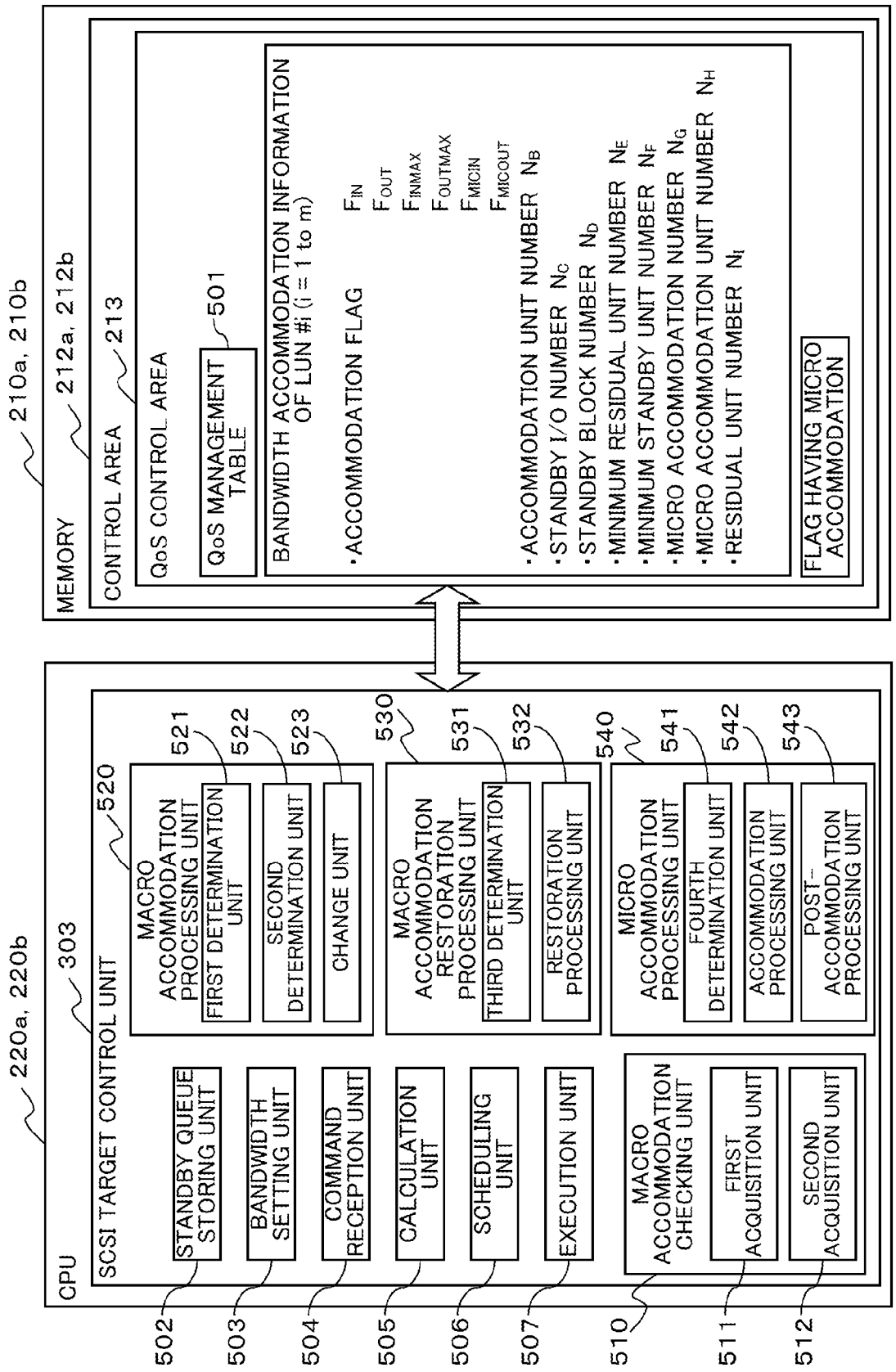
FIG. 3 is a block diagram that illustrates the functional configuration of a small computer system interface (SCSI) target control unit and information of a QoS control area according to this embodiment.

[1-5] Functional Configuration of SCSI Target Control Unit and Information of QoS Control Area According to this Embodiment Next, the functional configuration of the SCSI target control unit 303 and the information of the QoS control area according to this embodiment will be described with reference to FIG. 3. FIG. 3 is a block diagram that illustrates the functional configuration of the SCSI target control unit 303 and the information of the QoS control area 213 according to this embodiment As illustrated in FIG. 3, the SCSI target control unit 303 performs control based on a QoS management table 501 to be described later, bandwidth accommodation information of each LU (LUN #1 to #m; here, m is an integer of two or more) to be described later, a micro accommodation presence flag to be described later, and the like. The QoS management table 501, the bandwidth accommodation information of each LU, and the micro accommodation presence flag, for example, are stored in the QoS control areas 213 of the control areas 212a and 212b of the memories 210a and 210b.

As illustrated in FIG. 3, the SCSI target control unit 303 includes: a standby queue storing unit 502; a bandwidth setting unit 503; a command reception unit 504; a calculation unit 505; a scheduling unit 506; and an execution unit 507. In addition, the SCSI target control unit 303 includes: a macro accommodation checking unit 510; a macro accommodation processing unit 520; a macro accommodation restoration processing unit 530; and a micro accommodation processing unit 540. Each function of the SCSI target control unit 303 described below is realized by cooperation of the memories 210a and 210b and the CPUs 220a and 220b.

[1-5-1] Correspondence Relation between Priority Level and Bandwidth Value and QoS Management Table The QoS management table 501, for each target, stores information associated with a "priority level", "bandwidth values", "the number of input/output processes that can be executed", and "the number of executed input/output processes". Here, before detailed description of the QoS management table 501, first, the correspondence relation between the "priority level" and the "bandwidth values" will be described with reference to FIG. 4. FIG. 4 is a diagram that illustrates an example of the correspondence relation between the priority level and the bandwidth values.

As illustrated in FIG. 4, the "priority level" represents the degree of priority and, for example, is set as levels of 15 ranks of 1 to 15. Here, the levels of the priority level represent merely an example and are not limited to 15 ranks of 1 to 15.

The "bandwidth values" are associated with each rank of the "priority level". In other words, the "priority level" represents a bandwidth limit. As the "bandwidth values", megabytes per second (MB/s) that is a communication amount per unit time and input/output per second (IOPS) that is the number of input/output processes that can be executed per unit time are used. Specific "bandwidth values (MB/s and IOPS)" for the "priority level" (bandwidth setting level), for example, are set in consideration of a practical bandwidth as illustrated in FIG. 4.

In the example illustrated in FIG. 4, in a case where the "priority level" is set to "1", the communication amount per unit time is represented to be "800 (MB/s)", and "15,000" input/output processes are represented to be executed per unit time. Similarly, in a case where the "priority level" is set to "3", the communication amount per unit time is represented to be "600 (MB/s)", and "10,000" input/output processes are represented to be executed per unit time.

In the example illustrated in FIG. 4, the interval of the bandwidth values (MB/s) for the priority levels of 1 to 8 is 100, the interval of the bandwidth values (MB/s) for the priority levels of 8 to 10 is 30, the interval of the bandwidth values (MB/s) for the priority levels of 10 to 11 is 15, and the interval of the bandwidth values (MB/s) for the priority levels of 11 to 15 is 5. In other words, the bandwidth value (MB/s) is set to increase from a low level (15) of the "priority level" toward a high level (1).

Similarly, the interval of the bandwidth values (IOPS) for the priority levels of 1 to 5 is 2,500, the interval of the bandwidth values (IOPS) for the priority levels of 5 to 7 is 2,000, the interval of the bandwidth values (IOPS) for the priority levels of 7 to 10 is 200, the interval of the bandwidth values (IOPS) for the priority levels of 10 to 11 is 100, and the interval of the bandwidth values (IOPS) for the priority levels of 11 to 15 is 60. In other words, the bandwidth value (IOPS) is also set to increase from a low level (15) of the "priority level" toward a high level (1).

Figure 5:
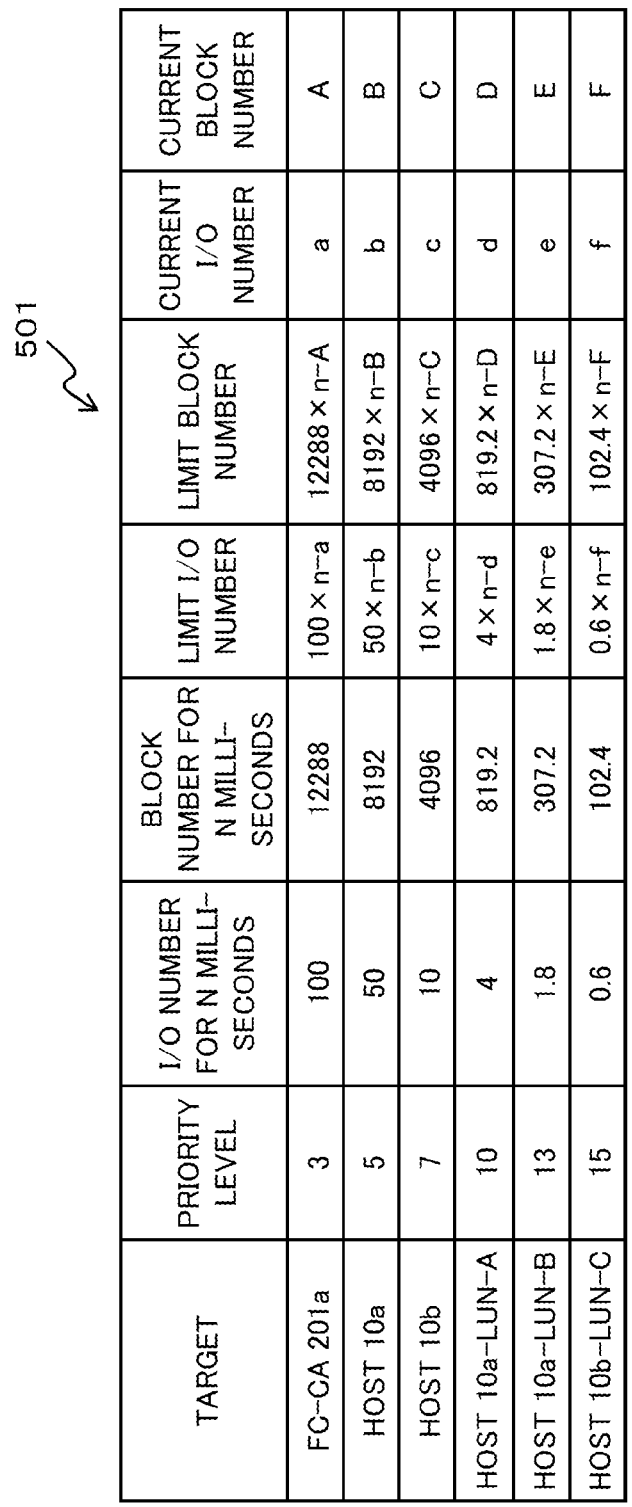
FIG. 5 is a diagram that illustrates an example of a QoS management table.

Next, an example of the QoS management table 501 will be described with reference to FIG. 5. FIG. 5 is a diagram that illustrates an example of the QoS management table 501. As illustrated in FIG. 5, the QoS management table 501 stores information associated with a "target", a "priority level", an "N milli-second I/O number", an "N milli-second block number", a "current I/O number", a "current block number", a "current I/O number", and a "current block number".

Here, the "target" stored in the QoS management table 501 represents a target for setting a priority level. Here, each of a "port", a "host", a "combination of a host and a LUN", and a "combination of a port and a LUN" is a target for setting the priority level. For example, in the "target", "FC-CA 201a", "host 10a", "host 10a-LUN-A", or the like is stored. In description presented below, in a case where a "combination of a host and a LUN" or a "combination of a port and a LUN" is represented as the "target", it will be described as only "a LU" as is appropriate.

The "priority level" represents the degree of priority set to the target. Here, it is assumed that, as the priority level, one of levels of 15 ranks from 1 to 15 is set. In the "priority level", for example, a level such as "3", "5", or "7" is stored.

The "N milli-second I/O number" represents the number of I/Os (the number of input/output requests or the number of input/output requests) that can be executed within a predetermined time (N milli-seconds). Here, as the predetermined time (N milli-seconds), for example, 10 milli-seconds, in other words, N=10 is set. In addition, in the "N milli-second I/O number", a value such as "100", "50", or "10" is stored.

The "N milli-second block number" represents the number of blocks that can be recorded within a predetermined time (N milli-seconds). The number of blocks is calculated based on the communication amount (MB/s) per unit time with one block being set as 512 bytes. Here, as the predetermined time (N milli-seconds), for example, ten milli-seconds is set. In other words, in the "N milli-second block number", as the number of blocks that can be recorded within 10 milli-seconds, a value such as "12,288", "8,192", or "4,096" is stored.

The "limit I/O number" represents an upper limit of the number of I/Os (input/output processing amount) that can be executed at the current time point. The limit I/O number is calculated by subtracting a "current I/O number" to be described later from a value acquired by multiplying the "N milli-second I/O number" by the "number (n) of times of elapsing of N milli-seconds". For example, in the "limit I/O number", a value such as "100×n−a", "50×n−b", or "10×n−c" is stored. Here, "n" is the "number of times of elapsing of N milli-seconds", and "a" to "c" represent the value of a corresponding "current I/O number" to be described later.

The "limit block number" represents an upper limit of the number of blocks (input/output processing amount) that can be recorded at the current time point. The limit block number is calculated by subtracting a "current block number" to be described later from a value acquired by multiplying the "N milli-second block number" by the "number (n) of times of elapsing of N milli-seconds". For example, in the "limit block number", a value such as "12288×n−A", "8192×n−B", or "4096×n−C" is stored. Here, "n" is the "number of times of elapsing of N milli-seconds", and "A" to "C" represent the value of a corresponding "current block number" to be described later.

The "current I/O number" represents an accumulated value of I/O numbers requested until a predetermined time. For example, in the "current I/O number", "a", "b", "c", or the like is stored. The "current block number" represents an accumulated value of block numbers requested until a predetermined time. For example, in the "current block number", "A", "B", "C", or the like is stored.

In the example illustrated in FIG. 5, the QoS management table 501 represents that the priority level of the "port" is "3", the "N milli-second I/O number" is "100", and the "N milli-second block number" is "12288". In addition, the QoS management table 501 represents that the "limit I/O number" is "100×n−a", the "limit block number" is "12288×n−A", the "current I/O number" is "a", and the "current block number" is "A".

In addition, the "target", the "priority level", the "N milli-second I/O number", and the "N milli-second block number" stored in the QoS management table 501 are values that are initially set by the bandwidth setting unit 503 to be described later. Furthermore, the "limit I/O number", the "limit block number", the "current I/O number", and the "current block number" stored in the QoS management table 501 are values that are updated every N milli-seconds.

[1-5-2] Standby Queue Storing Unit

The standby queue storing unit 502 is a queue and stores a command scheduled after the elapse of a predetermined time among commands received by the command reception unit 504. In addition, the standby queue storing unit 502 is provided for each combination of a host and a LUN or each combination of a port and a LUN (for each LU).

[1-5-3] Bandwidth Setting Unit

The bandwidth setting unit 503 sets values received from a supervisor to the "target", the "priority level", the "N milli-second I/O number", and the "N milli-second block number" among the information stored in the QoS management table 501. In addition, the bandwidth setting unit 503 also has a function for setting various conditions for micro bandwidth accommodation (micro bandwidth accommodation) and macro bandwidth accommodation (macro bandwidth accommodation) to be described later, values relating to the various conditions, and the like with reference to Table 1 in accordance with an instruction from the supervisor. Furthermore, the supervisor sets values relating to the priority level and various conditions and the like with the bandwidth of each host 10, an application executed by each host 10, and the like being taken into consideration. In addition, in a case where the host 10 connecting to the storage apparatus 100 or the combination (LU) of the host 10 and the LUN is changed, the bandwidth setting unit 503 updates information stored in the QoS management table 501.

[1-5-4] Command Reception Unit

The command reception unit 504 receives and accepts a command (an input/output request) from the host 10 and determines whether or not there is a command waiting for being executed. For example, in a case where it is determined that there is a command waiting for being executed, the command reception unit 504 stores the received command in the standby queue storing unit 502. On the other hand, in a case where it is determined that there is no command waiting for being executed, the command reception unit 504 causes the scheduling unit 506 to be described later to schedule the execution sequence of the received command. A detailed operation (the processing sequence of a command reception process) of the command reception unit 504 will be described later with reference to FIG. 10.

[1-5-5] Calculation Unit

The calculation unit 505 calculates upper limits (in other words, the limit I/O number and the limit block number) of the input/output processing amount that is determined based on a priority level set for each of the host 10, the port, and the LU for every predetermined time (N milli-seconds). Here, the calculation unit 505 will be assumed to calculate the limit I/O number and the limit block number for every 10 milli-seconds in the description. For example, the calculation unit 505 adds an N milli-second I/O number to the limit I/O number every 10 milli-seconds. In addition, the calculation unit 505 adds an N milli-second block number to the limit block number for every 10 milli-seconds. The calculation unit 505 stores the limit I/O number and the limit block number that have been calculated in the QoS management table 501.

In addition, the calculation unit 505 has functions as below so as to respond to the macro bandwidth accommodation to be described later. The calculation unit 505, as described above, adds the N milli-second I/O number to the limit I/O number of the accommodation destination LU (an LU of which the accommodation flag $F_{IN}$ is "On") and further adds an I/O number corresponding to a accommodation unit number $N_B$ to be described later thereto for every 10 milli-seconds (see FIG. 7). Similarly, the calculation unit 505, as described above, adds the N milli-second block number to the limit block number of the accommodation destination LU and further adds a block number corresponding to the accommodation unit number $N_B$ thereto for every 10 milli-seconds (see FIG. 7).

On the other hand, the calculation unit 505 subtracts the I/O number corresponding to the accommodation unit number $N_B$ from a value acquired by adding the N milli-second I/O number to the limit I/O number of the accommodation source LU (an LU of which a accommodation flag $F_{OUT}$ is "On") as described above for every 10 milli-seconds (see FIG. 7). Similarly, the calculation unit 505 subtracts the block number corresponding to the accommodation unit number $N_B$ from a value acquired by adding the N milli-second block number to the limit block number of the accommodation source LU as described above for every 10 milli-seconds (see FIG. 7).

[1-5-6] Scheduling Unit

The scheduling unit 506 schedules the execution sequence of commands based on the command number received from the host 10 and the limit I/O number and the limit block number calculated by the calculation unit 505. For example, the scheduling unit 506 schedules the execution sequence of commands every time when a predetermined time elapses. A detailed operation (the processing sequence of the QoS I/O startup scheduling process) of the scheduling unit 506 will be described later with reference to FIGS. 8 and 9.

In addition, the scheduling unit 506 recovers a marked host and a marked LUN. Then, the scheduling unit 506 performs the following process in order from a combination of the host and the LUN that have been recovered. The marking of the host and the marking of the LUN will be described later.

First, the scheduling unit 506 determines whether or not the command number received from the host 10 can be processed within the limit I/O number and the limit block number of each of the host, the port, and the LUN that are calculated by the calculation unit 505. Here, in a case where it is determined that the received command number is within the limit I/O number and the limit block number and can be processed, the scheduling unit 506 causes the execution unit 507 to start up the command.

In addition, in a case where it is determined that the command number can be processed, the scheduling unit 506 stores a value acquired by adding an I/O number corresponding to the started command to the "current I/O number" stored in the QoS management table 501 in the "current I/O number". Similarly, in a case where it is determined that the command number can be processed, the scheduling unit 506 stores a value acquired by adding a block number corresponding to the started command to the "current block number" stored in the QoS management table 501 in the "current block number".

In addition, in a case where it is determined that the command number can be processed, the scheduling unit 506 stores a value acquired by subtracting the I/O number corresponding to the started command from the "limit I/O number" stored in the QoS management table 501 in the "limit I/O number". Similarly, in a case where it is determined that the command number can be processed, the scheduling unit 506 stores a value acquired by subtracting the block number corresponding to the started command from the "limit block number" stored in the QoS management table 501 in the "limit block number".

On the other hand, in a case where it is determined that the received command number is not within the limit I/O number and the limit block number, after a predetermined time elapses, the scheduling unit 506 determines whether or not the command number received from the host 10 is within the limit I/O number and the limit block number that have been newly calculated.

For example, in a case where the received command number is determined not to be within the limit I/O number and the limit block number of the port, the scheduling unit 506 marks the combination of the host and the LUN and, after a predetermined time elapses, executes the schedule from the marked combination of the host and the LUN. In addition, for example, in a case where it is determined that the received command number is within the limit I/O number and the limit block number of the port but is not within the limit I/O number and the limit block number of the host, the scheduling unit 506 marks the LUN. Then, the scheduling unit 506 sets the next LUN and determines whether or not the command number received from the host 10 is within the limit I/O number and the limit block number that have been newly calculated. Here, in a case where there is no next LUN, the scheduling unit 506 sets the next host and determines whether or not the received command number is within the limit I/O number and the limit block number that have been newly calculated.

In addition, in a case where it is determined that there is no command waiting for being executed by the command reception unit 504, the scheduling unit 506 schedules the execution sequence of commands without waiting for the elapse of the predetermined time. For example, the scheduling unit 506 determines whether or not the command number received from the host 10 can be processed within the limit I/O number and the limit block number of each other the host, the port, and the LUN that are calculated by the calculation unit 505. Here, in a case where it is determined that the command number received from the host 10 cannot be performed within the limit I/O number and the limit block number of any one of the port, the host, and the LUN, the scheduling unit 506 stores the command in the standby queue storing unit 502. Then, after a predetermined time elapses, the scheduling unit 506 determines whether or not the command number received from the host 10 is within the limit I/O number and the limit block number that have been newly calculated.

[1-5-7] Execution Unit

The execution unit 507 dequeues a command from the standby queue storing unit 502 in the execution order scheduled by the scheduling unit 506 and starts up the command so as to perform the input/output process.

[1-5-8] Micro Bandwidth Accommodation and Macro Bandwidth Accommodation

Next, before the macro accommodation checking unit 510, the macro accommodation processing unit 520, the macro accommodation restoration processing unit 530, and the micro accommodation processing unit 540 are be described, two types of bandwidth accommodation systems employed in this embodiment will be described. The two types of bandwidth accommodation systems are a micro bandwidth accommodation system and a macro bandwidth accommodation system.

In addition, hereinafter, the adjustment of the upper limit of the input/output processing amount, in other words, the bandwidth limit value of each LU (or each host) for improving the processing bandwidth of the storage apparatus 100 will be referred to as "bandwidth accommodation (flexibility of bandwidth)". In the "bandwidth accommodation", a LU of which the bandwidth limit value is changed to be raised so as to resolve the insufficiency of the processing bandwidth is called a "accommodation destination LU". In addition, in the "bandwidth accommodation", in a case where the bandwidth limit value of the "accommodation destination LU" is raised, the bandwidth limit value of an LU having processing bandwidth to spare is changed to be lowered by an amount corresponding to the raise of the bandwidth limit value of the "accommodation destination LU". In this way, bandwidth accommodation from the LU having processing bandwidth to spare to the "accommodation destination LU" is performed. As described above, the "LU having processing bandwidth to spare" that accommodates the processing bandwidth to the "accommodation destination LU" is called a "accommodation source LU".

The "micro bandwidth accommodation" is an effective system that is used when a temporary spike bandwidth or the like is absorbed. In the "micro bandwidth accommodation", for example, at the cycle (micro cycle) of one second or less, the processing bandwidth is accommodated to a LU having insufficient processing bandwidth from a LU having processing bandwidth to spare. The accommodation amount (a micro accommodation unit number $N_H$ to be described later) at this time is neither stored nor reflected on the adjustment of the bandwidth limit value at the next micro cycle. Accordingly, the storage apparatus 100 operates with the original processing bandwidth at the next micro cycle. As above, since the "micro bandwidth accommodation" is temporary accommodation, by using the "micro bandwidth accommodation", a large amount of bandwidth accommodation can be made at a time.

The "macro bandwidth accommodation" is a system for learning and adjusting a bandwidth accommodation amount (the adjustment amount of the bandwidth limit) and causing the processing bandwidth of each LU to follow the actual input/output bandwidth in a case where the processing bandwidth requested from the host 10 changes to various statuses. In the "macro bandwidth accommodation", for example, the processing bandwidth is monitored at a long cycle (macro cycle), for example, of two seconds or more. Then, the processing bandwidth is accommodated to a LU of which the bandwidth is insufficient for a predetermined time (for example, one macro cycle) from a LU having processing bandwidth to spare for the predetermined time. In this way, according to the "macro bandwidth accommodation", the bandwidth accommodation amount is adjusted based on learning, and accordingly, a continuous change in the processing bandwidth requested from the host 10 can be effectively responded.

In the "macro bandwidth accommodation" according to this embodiment, for each LU, by checking the insufficiency of the processing bandwidth or room for the processing bandwidth to spare, for example, every one second, it is determined whether to perform macro bandwidth accommodation for every macro cycle of two seconds or more. For example, within one macro cycle, for every one second, it is checked whether the processing bandwidth is insufficient or whether there is room for processing bandwidth to spare. At this time, a condition that a accommodation destination LU of which the processing bandwidth is insufficient is constantly present within one macro cycle, and a accommodation source LU having room for the processing bandwidth to spare is constantly present within one macro cycle is set as the condition for the execution of the macro bandwidth accommodation. In a case where the execution condition for the macro bandwidth accommodation is satisfied, macro bandwidth accommodation from the accommodation source LU to the accommodation destination LU is performed in a predetermined bandwidth accommodation unit.

In addition, in the "macro bandwidth accommodation" according to this embodiment, the changing of the accommodation amount per one macro cycle is performed in a predetermined bandwidth accommodation unit (unitary unit). In this embodiment, the input/output processing amount of the predetermined bandwidth accommodation unit (unitary unit) is set to a minimum interval of the input/output processing amount (the bandwidth values MB/s and IOPS) determined based on the priority level or less. Hereinafter, the input/output processing amount of the predetermined bandwidth accommodation unit will be referred to as a "unit". For example, in the correspondence relation between the priority level and the bandwidth value illustrated in FIG. 4, since the minimum intervals of the bandwidth value for the priority level are 5 MB/s and 60 IOPS, for example, "one unit" is set as 5 MB/s and 60 IOPS.

Here, as described above, a case will be described in which a conventional technology responding to a change in the load status by changing the priority level is used. In such a case, in the example illustrated in FIG. 4, the change intervals (accommodation amounts) of the bandwidth limits in the range of priority levels 1 to 7 are 100 for the bandwidth value MB/s and 2500 or 2000 for the bandwidth value IOPS and are much larger than the change intervals (accommodation amounts) in the range of the priority levels 8 to 15. When the change interval of the bandwidth limit value is larger, by only raising/lowering the priority level, the adjustment range is limited, and accordingly, a change in the bandwidth requested from the host 10 is difficult to be delicately followed. In contrast to this, in the "macro bandwidth accommodation" according to this embodiment, the bandwidth accommodation is performed in units of the minimum intervals of 5 MB/s and 60 IOPS of the bandwidth values for the priority level as "one unit". Accordingly, the change interval (accommodation amount) of the bandwidth limit is much smaller than that of a case where the bandwidth limit is changed by changing the priority level. Thus, a change in the processing bandwidth requested from the host 10 can be delicately followed, whereby various bandwidth changes can be responded.

In this embodiment, any one of the micro bandwidth accommodation and the macro bandwidth accommodation may be used based on the characteristics of the micro bandwidth accommodation and the macro bandwidth accommodation described above, or both thereof may be used together. In a case where only one thereof is used, by appropriately setting parameters and the like represented in Table 1, more effective accommodation is performed. On the other hand, in a case where both thereof are used, by performing control such that the micro bandwidth accommodation is used for absorbing a temporary spike bandwidth and the like, and the macro bandwidth accommodation is used for absorbing a continuous bandwidth change, the characteristics of the both thereof can be effectively used.

Next, various conditions for the micro bandwidth accommodation and the macro bandwidth accommodation, values relating to the various conditions, and the like will be described with reference to the following Table 1. As described above, the various conditions, the values relating to the various conditions, and the like are set in accordance with an instruction from a supervisor by the bandwidth setting unit 503. The micro bandwidth accommodation and the macro bandwidth accommodation are performed based on the various conditions and values set as in Table 1.

As illustrated in the following Table 1, in the "micro bandwidth accommodation" and the "macro bandwidth accommodation", various conditions and values are set and used as below. As the various conditions and the values, a "cycle", the "number of accommodating LUs in one cycle", a "accommodation number limit", a "accommodation amount", a "condition for receiving accommodation", a "condition for accommodation", and a "return condition" are set.

TABLE 1

|  | MICRO BANDWIDTH ACCOMMODATION | MACRO BANDWIDTH ACCOMMODATION |
|---|---|---|
| CYCLE | FOR EXAMPLE, 0.5 SECONDS | FOR EXAMPLE, 30 SECONDS |
| NUMBER OF ACCOMMODATING LUs IN ONE CYCLE | MAXIMUM OF 4 LUs. TUNING UP TO 16 LUs CAN BE PERFORMED. | MAXIMUM OF 4 LUs. TUNING UP TO 16 LUs CAN BE PERFORMED. |
| ACCOMMODATION NUMBER LIMIT | UP TO 4 TIMES PER ONE CYCLE OF MACRO ACCOMMODATION. TUNING CAN BE PERFORMED. | NONE. THERE ARE UPPER LIMIT AND LOWER LIMIT OF BANDWIDTH VALUES. |
| ACCOMMODATION AMOUNT | ACCOMMODATION AMOUNT OF ONE TIME IS TWICE SET BANDWIDTH. TUNING CAN BE PERFORMED. | ACCOMMODATION OF ONE TIME IS IN UNITARY UNIT. ONE UNIT, FOR EXAMPLE, IS BI-DIRECTIONAL SIMULTANEOUS |

TABLE 1-continued

| | MICRO BANDWIDTH ACCOMMODATION | MACRO BANDWIDTH ACCOMMODATION |
|---|---|---|
| | | ACCOMMODATION AT 60 IOPS AND 5 MB/s. |
| CONDITION FOR RECEIVING ACCOMMODATION | DETECTION OF STANDBY I/Os (NUMBER OF I/Os OR NUMBER OF BLOCKS) THAT ARE TWO TO FOUR TIMES SET BANDWIDTH IN ONE CYCLE. | DETECTION OF INSUFFICIENT PROCESSING BANDWIDTH CONTINUOUSLY FOR 30 SECONDS. |
| CONDITION FOR ACCOMMODATION | THERE IS ABOVE-DESCRIBED ACCOMMODATION AMOUNT OR MORE TO SPARE. | THERE IS PROCESSING BANDWIDTH TO SPARE CONTINUOUSLY FOR 30 SECONDS. |
| RETURN CONDITION | — | DETECTION OF INSUFFICIENT PROCESSING BANDWIDTH IN LU (ACCOMMODATION SOURCE LU) ACCOMMODATED TO OTHER. AT TIME OF CHANGING SETTING RELATING TO QoS. |

The "cycle" is a cycle at which the bandwidth accommodation is performed. The "cycle" (micro cycle) at which the micro bandwidth accommodation is performed, for example, is set to 0.5 seconds, and the cycle (macro cycle) at which the macro bandwidth accommodation is performed, for example, is set to 30 seconds.

The "number of accommodating LUs in one cycle" is an upper limit of the number of LUs for which the bandwidth accommodation is performed within one cycle.

The "number of accommodating LUs in one cycle" of the micro bandwidth accommodation, for example, is a maximum of 4 LUs (default) and can be tuned up to 16 LUs. In addition, the "number of accommodating LUs in one cycle" of the macro bandwidth accommodation, for example, is a maximum of 4 LUs (default) and can be tuned up to 16 LUs.

The "accommodation number limit" is information that relates to the limit of the number of times of executing the bandwidth accommodation. The "accommodation number limit" of the micro bandwidth accommodation, for example, is up to four times per one cycle (macro cycle; 30 seconds) of the macro bandwidth accommodation for one LU and can be tuned. In addition, the "accommodation number limit" of the macro bandwidth accommodation is set as "none". However, the upper limit and the lower limit thereof are set.

The "accommodation amount" is the amount that is accommodated per one time of executing bandwidth accommodation. The "accommodation amount" of the micro bandwidth accommodation, for example, is set as twice the set bandwidth (for example, a bandwidth value set in accordance with the priority level illustrated in FIG. 4) per one time and can be tuned. In addition, the "accommodation amount" of the macro bandwidth accommodation, for example, is set as the above-described one unit (a predetermined bandwidth accommodation unit) per one time, in other words, the accommodation is executed at the same time at both 60 IOPS and 5 MB/s.

The "condition for receiving accommodation" is a condition for a LU to receive bandwidth accommodation from another LU, in other words, a condition for a LU to be a accommodation destination LU. The condition for "receiving accommodation" of the micro bandwidth accommodation is that the LU has detected standby I/Os (the I/O number or the block number) that are two to four times the bandwidth (bandwidth value) set in one micro cycle. In addition, the condition for "receiving accommodation" of the macro bandwidth accommodation is that the LU has detected insufficiency of the processing bandwidth continuously for 30 seconds (first predetermined time).

The "condition for accommodation" is a condition for an LU to accommodate the bandwidth to another LU, in other words, a condition for a LU to be a accommodation source LU. The "condition for accommodation" of the micro bandwidth accommodation is that there is equal to or more than the "accommodation amount" to spare at the time of performing micro accommodation. In addition, the "condition for accommodation" of the macro bandwidth accommodation is that there is processing bandwidth to spare in the LU continuously for 30 seconds (second predetermined time).

The "return condition" is a condition for returning (recovering) the input/output processing amount accommodated from the accommodation source LU to the accommodation destination LU from the accommodation destination LU to the accommodation source LU. In the micro bandwidth accommodation, as described above, the accommodation amount is not stored, and the storage apparatus 100 operates with the original processing bandwidth at the next micro cycle, and accordingly, the "return condition" of the micro bandwidth accommodation is not set. In addition, the "return condition" of the macro bandwidth accommodation is set as detecting bandwidth insufficiency in the accommodation source LU that has performed the bandwidth accommodation for another LU. Furthermore, the returning (recovering) of the macro bandwidth accommodation is performed also when a setting relating to the QoS is changed.

[1-5-9] Bandwidth Accommodation Information of LU

Next, the bandwidth accommodation information of each LU that is maintained in the QoS control area 213 for each LU (LUN #1 to #m; here, m is an integer equal to or greater than two), as illustrated in FIG. 3, for executing the micro bandwidth accommodation and the macro bandwidth accommodation described above will be described. In other words, in the QoS control area 213, for each LU, for example, six kinds of accommodation flags $F_{IN}$, $F_{OUT}$, $F_{INMAX}$, $F_{OUTMAX}$, $F_{MICIN}$, and $F_{MICOUT}$ and eight kinds of numerical values $N_B$, $N_C$, $N_D$, $N_E$, $N_F$, $N_G$, $N_H$, and $N_I$ are stored as the bandwidth accommodation information. The accommodation flags and the numerical values are set by the bandwidth setting unit 503 in accordance with an instruction from a supervisor or are set and updated based on the function of the SCSI target control unit 303 during the execution of the micro bandwidth accommodation and the macro bandwidth accommodation.

The accommodation flag $F_{IN}$ is set to On in a case where the target LU receives macro bandwidth accommodation from another LU, in other words, in a case where the target LU is the accommodation destination LU and is set to Off in any other case.

The accommodation flag $F_{OUT}$ is set to On in a case where the target LU performs macro bandwidth accommodation for another LU, in other words, in a case where the target LU is the accommodation source LU and is set to Off in any other case.

The accommodation flag $F_{INMAX}$ is set to On in a case where the accommodation amount of the macro bandwidth accommodation received by the target LU from another LU has arrived at an upper limit set in advance (at the time of arrival at the upper limit) and is set to Off in any other case.

The accommodation flag $F_{OUTMAX}$ is set to On in a case where the accommodation amount of the macro bandwidth accommodation from the target LU to another LU has arrived at a lower limit set in advance (at the time of arrival at the lower limit) and is set to Off in any other case.

The accommodation flag $F_{MICIN}$ is set to On in a case where the target LU receives micro bandwidth accommodation from another LU and is set to Off in any other case.

The accommodation flag $F_{MICOUT}$ is set to On in a case where the target LU performs micro bandwidth accommodation for another LU and is set to Off in any other case.

The accommodation unit number $N_B$ is the number of units corresponding to a accommodation amount of a case where the target LU receives macro bandwidth accommodation by the target LU from another LU or a case where the target LU performs macro bandwidth accommodation for another LU. Here, the accommodation unit number $N_B$ is a value acquired by converting the accommodation amount into a number of the predetermined bandwidth accommodation unit described above.

The standby I/O number $N_C$ is the number of I/Os (input/output requests or commands from the host 10) of the target LU that are in the standby state in the QoS control process.

The standby block number $N_D$ is the total number of blocks of I/Os (input/output requests or commands from the host 10) of the target LU that are in the standby state in the QoS control process.

The standby I/O number $N_C$ and the standby block number $N_D$ are converted into a unit number (the number of standby units) corresponding to the standby-state I/Os in the QoS control process.

The minimum residual unit number $N_E$ is a minimum value (minimum residual amount) of the residual unit number $N_I$ for every one second in the target LU. Here, the residual unit number $N_I$ is a value acquired by converting the residual processing amount into the number of the above-described predetermined bandwidth accommodation units in correspondence with a residual processing amount (residual value) of the processing amount relating to I/Os for the target LU with respect to the processing bandwidth of the target LU.

The minimum standby unit number $N_F$ is a minimum value (minimum standby amount) of the standby units in the target LU for every one second. Here, the standby unit number, as described above, is the number of units corresponding to the standby-state I/Os in the QoS control process that is a value converted from the standby I/O number $N_C$ and the standby block number $N_D$.

The micro accommodation number $N_G$ is a value corresponding to the "accommodation number limit" (see Table 1) when the target LU performs the micro bandwidth accommodation and is a limit value (for example, four times) of the number of times of executing the micro bandwidth accommodation in the target LU within one macro cycle (for example 30 seconds).

The micro accommodation unit number $N_H$ is the number of units corresponding to a temporary accommodation amount received by the target LU from another LU through the micro bandwidth accommodation of this time or a temporary accommodation amount that is accommodated by the target LU to another LU. In other words, the micro accommodation unit number $N_H$ is a value acquired by converting the temporary accommodation amount into the number of the above-described predetermined bandwidth accommodation units.

The residual unit number $N_I$, as presented above in the description of the minimum residual unit number $N_E$, corresponds to a residual processing amount (residual value) of the processing amount relating to the I/Os for the target LU with respect to the processing bandwidth of the target LU. The residual unit number $N_I$ is a value acquired by converting the residual processing amount into the number of the above-described predetermined bandwidth accommodation units.

[1-5-10] Macro Accommodation Checking Unit

The macro accommodation checking unit 510 checks and acquires information (the minimum residual unit number $N_E$ and the minimum standby unit number $N_F$) for determining whether or not the macro bandwidth accommodation is performed by first and second determination units 521 and 522. Accordingly, the macro accommodation checking unit 510 includes first and second acquisition units 511 and 512. A detailed operation (the processing sequence of a macro accommodation one-second checking process) of the macro accommodation checking unit 510 will be described later with reference to FIG. 13.

The first acquisition unit 511 acquires the minimum standby unit number $N_F$ that is information for determining the above-described "condition for receiving accommodation" of the macro bandwidth accommodation by the first determination unit 521 to be described later. In other words, the first acquisition unit 511, for each LU, acquires the standby unit number (the processing standby amount of I/Os) for the LU at a time interval (for example, at an interval of one second) shorter than one macro cycle (for example 30 seconds; the first predetermined time). At this time, the standby unit number for every one second, as described above, is acquired by converting the standby I/O number $N_C$ and the standby block number $N_D$.

Then, the first acquisition unit 511, for each LU, acquires a minimum value of the standby unit numbers acquired during one macro cycle as the minimum standby unit number (minimum standby amount) $N_F$. At this time, the first acquisition unit 511, every time when the standby unit number is acquired for every one second during one macro cycle, compares the standby unit number acquired this time and a value (a minimum standby unit number until the current time point) $N_F$ stored in the QoS control area 213 with each other. In a case where the standby unit number acquired this time is less than the value $N_F$, the first acquisition unit 511 replaces the value $N_F$ with the standby unit number acquired this time. The first acquisition unit 511 repeats the above-described process, whereby the value $N_F$ stored in the QoS control area 213 at a time point when one macro cycle elapses is the minimum standby unit number $N_F$.

The second acquisition unit 512 acquires the minimum residual unit number $N_E$ that is information for determining the above-described "condition for accommodation" of the macro bandwidth accommodation by the second determination unit 522 to be described later. In other words, the second acquisition unit 512, for each LU, acquires the residual unit number (the residual processing amount) for the LU at a time interval (for example, at an interval of one second) shorter than one macro cycle (for example 30 seconds; the second predetermined time). At this time, the residual unit number for every one second is acquired by referring to the residual unit number $N_I$ stored in the QoS control area 213 for every one second.

Then, the second acquisition unit 512, for each LU, acquires a minimum value of the residual unit numbers $N_I$ acquired during one macro cycle as the minimum residual unit number (minimum residual amount) $N_E$. At this time, the second acquisition unit 512, every time when the residual unit number $N_I$ is acquired for every one second during one macro cycle, compares the residual unit number $N_I$ acquired this time and a value (a minimum residual unit number until the current time point) $N_E$ stored in the QoS control area 213 with each other. In a case where the residual unit number acquired this time is less than the value $N_E$, the second acquisition unit 512 replaces the value $N_E$ with the residual unit number $N_I$ acquired this time. The second acquisition unit 512 repeats the above-described process, whereby the value $N_E$ stored in the QoS control area 213 at a time point when one macro cycle elapses is the minimum residual unit number $N_E$.

[1-5-11] Macro Accommodation Processing Unit

The macro accommodation processing unit 520 performs the macro bandwidth accommodation using the first and second acquisition units 511 and 512 of the macro accommodation checking unit 510 based on the minimum standby unit number $N_F$ and the minimum residual unit number $N_E$ that have been acquired. The macro accommodation processing unit 520 includes the first determination unit 521, the second determination unit 522, and a change unit 523. A detailed operation (the processing sequence of the macro accommodation process) of the macro accommodation processing unit 520 will be described later with reference to FIGS. 14 and 15.

The first determination unit 521 determines whether or not each LU satisfies the above-described "condition for receiving accommodation" of the macro bandwidth accommodation. In other words, the first determination unit 521, for each LU, determines whether or not the processing amount relating to I/Os for the LU exceeds the processing bandwidth of the LU for one macro cycle (the first predetermined time; 30 seconds). More specifically, in a case where the minimum standby unit number $N_F$ acquired by the first acquisition unit 511 for the LU is not zero, the first determination unit 521 determines that the processing amount relating to the I/Os for the LU exceeds the processing bandwidth of the LU for one macro cycle. In other words, the first determination unit 521 determines that the LU is a accommodation destination LU satisfying the above-described "condition for receiving accommodation" of the macro bandwidth accommodation.

The second determination unit 522 determines whether or not each LU satisfies the above-described "condition for accommodation" of the macro bandwidth accommodation. In other words, the second determination unit 522, for each LU, determines whether or not the processing amount relating to I/Os for the LU exceeds the processing bandwidth of the LU for one macro cycle (the second predetermined time; 30 seconds). More specifically, in a case where the minimum residual unit number $N_E$ acquired by the second acquisition unit 412 for the LU is not zero, the second determination unit 522 determines that the processing amount relating to the I/Os for the LU is below the processing bandwidth of the LU for one macro cycle. In other words, the second determination unit 522 determines that the LU is a accommodation source LU satisfying the above-described "condition for accommodation" of the macro bandwidth accommodation.

The change unit 523 changes the bandwidth limit value of the target LU in the unitary unit in accordance with results of the determinations made by the first and second determination units 521 and 522, thereby performing macro bandwidth accommodation from the accommodation source LU to the accommodation destination LU in one unitary unit. In other words, in a case where the result of the determination made by the first determination unit 521 is as illustrated in article (a1) represented below and in a case where the result of the determination made by the second determination unit 522 is as illustrated in article (a2) represented below, the change unit 523 performs a change process illustrated in article (a3) represented below.

(a1) case where one LU (first storage device) is a accommodation destination LU satisfying the above-described "condition for receiving accommodation" of the macro bandwidth accommodation as the result of the determination made by the first determination unit 521

(a2) case where another LU (second storage device) is a accommodation source LU satisfying the above-described "condition for accommodation" of the macro bandwidth accommodation as the result of the determination made by the second determination unit 522

(a3) Change Process: values corresponding to one unit are added to the bandwidth limits calculated for the accommodation destination LU in the above-described predetermined bandwidth accommodation unit and values corresponding to one unit are subtracted from the bandwidth limits calculated for the accommodation source LU

[1-5-12] Macro Accommodation Restoration Processing Unit

In a case where each LU satisfies the above-described "return condition", the macro accommodation restoration processing unit 530 performs a restoration process recovering the processing amount accommodated to the accommodation destination LU from the accommodation destination LU to the accommodation source LU. The macro accommodation restoration processing unit 530 includes a third determination unit 531 and a restoration processing unit 532. A detailed operation (the processing sequence of the macro accommodation restoration process) of the macro accommodation restoration processing unit 530 (particularly, the restoration processing unit 532) will be described with reference to FIGS. 16 to 20.

The third determination unit 531 determines whether or not each LU satisfies the above-described "return condition" of the macro bandwidth accommodation. In other words, the third determination unit 531, for each LU, determines whether or not the LU is the accommodation source LU (second storage device) that has performed the macro bandwidth accommodation for one or more accommodation destination LUs (first storage device) and is a accommodation restoration target for which waiting for the I/O process for the LU occurs.

In a case where the LU is determined to be the accommodation restoration target (hereinafter, referred to as a accommodation restoration LU) by the third determination unit 531, the restoration processing unit 532 performs a restoration process returning the processing amount accommodated to other LUs by the accommodation restoration LU from one or more accommodation destination LUs to the accommodation restoration LU. At that time, the restoration processing unit 532 returns the processing amount from the one or more accommodation destination LUs to the accommodation restoration LU such that the residual amounts of the processing amounts accommodated to the one or more accommodation destination LUs are uniform or approximately uniform.

[1-5-13] Micro Accommodation Processing Unit

The micro accommodation processing unit 540 performs the micro bandwidth accommodation and includes a fourth determination unit 541, a accommodation processing unit 542, and a post-accommodation processing unit 543. A detailed operation (the processing sequence of the micro accommodation process and the post-process of micro accommodation) of the micro accommodation processing unit 540 will be described later with reference to FIGS. 11 and 12. The number of times of the micro bandwidth accommodation performed by the micro accommodation processing unit 540 is limited to a value (for example, "4") set in the QoS control area 213 as the micro accommodation number $N_G$ for every one macro cycle.

The fourth determination unit 541 determines whether or not each LU satisfies the "condition for receiving accommodation" of the micro bandwidth accommodation. In other words, the fourth determination unit 541, for each LU, determines whether or not the processing amount (the standby unit number) relating to I/Os for the LU is equal to or more than a predetermined times (for example, four times) of the processing bandwidth (bandwidth value/set value) of the LU.

Figure 11:
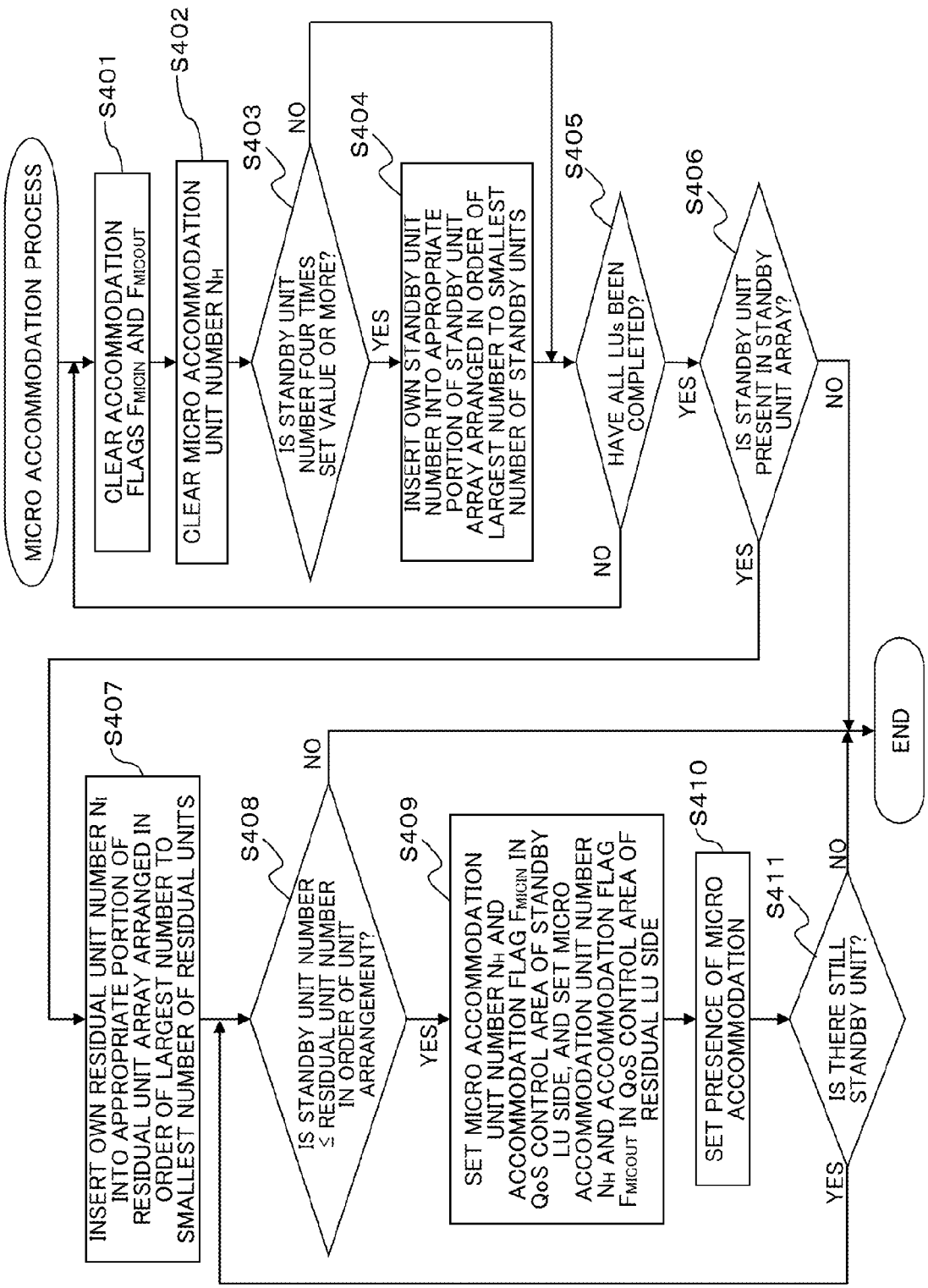
FIG. 11 is a flowchart that illustrates the processing sequence of a micro accommodation process according to this embodiment.

The accommodation processing unit 542 and the post-accommodation processing unit 543, for the LU determined to satisfy the "condition for receiving accommodation" by the fourth determination unit 541, cooperatively perform the micro bandwidth accommodation from a LU having processing to spare exceeding the processing amount relating to I/Os for the LU. Here, the "accommodation amount" accommodated through one time of the micro bandwidth accommodation is limited to twice the set bandwidth (see Table 1 described above). In addition, the "accommodation amount" of the micro bandwidth accommodation is maintained in the QoS control area 213 as the micro accommodation unit number $N_H$. The value of the micro accommodation unit number $N_H$ maintained in the QoS control area 213, as will be described later with reference to FIG. 11, is cleared at the time of starting one micro cycle. Accordingly, the micro bandwidth accommodation with a accommodation amount corresponding to the value of the micro accommodation unit number $N_H$ is executed only once (one micro cycle).

The accommodation processing unit 542 operates before the QoS I/O startup scheduling process (see FIG. 6) performed by the scheduling unit 506. The accommodation processing unit 542, for every one micro cycle, searches for accommodation destination LUs (standby LUs) having high bandwidth insufficiency (for example, bandwidth insufficiency equal to or more than four times of the set value) and, in a case where there are corresponding accommodation destination LUs, searches for accommodation source LUs (residual LUs) having the processing bandwidth to spare. Then, the accommodation processing unit 542 stores a standby unit array and a residual unit array in which the standby unit numbers of the retrieved standby LUs and the residual unit numbers of the retrieved residual LUs are respectively aligned in order of greatest to least. The accommodation processing unit 542 determines a combination of the standby LU and the residual LU for which the micro bandwidth accommodation is performed based on the standby unit array and the residual unit array. In addition, the accommodation processing unit 542 sets the micro accommodation unit number $N_H$ and the accommodation flags $F_{MICIN}$ and $F_{MICOUT}$ in the QoS control areas 213 of the LUs of the determined combination. Furthermore, in a case where a combination of the standby LU and the residual LU for which the micro bandwidth accommodation is performed is determined in one set, the accommodation processing unit 542 sets the micro accommodation flag (see FIG. 3) of the QoS control area 213 to be On and notifies the post-accommodation processing unit 543 that the micro bandwidth accommodation is performed. The accommodation processing unit 542 performs the micro accommodation process as above in the processing sequence to be described in detail with reference to FIG. 11.

Figure 6:
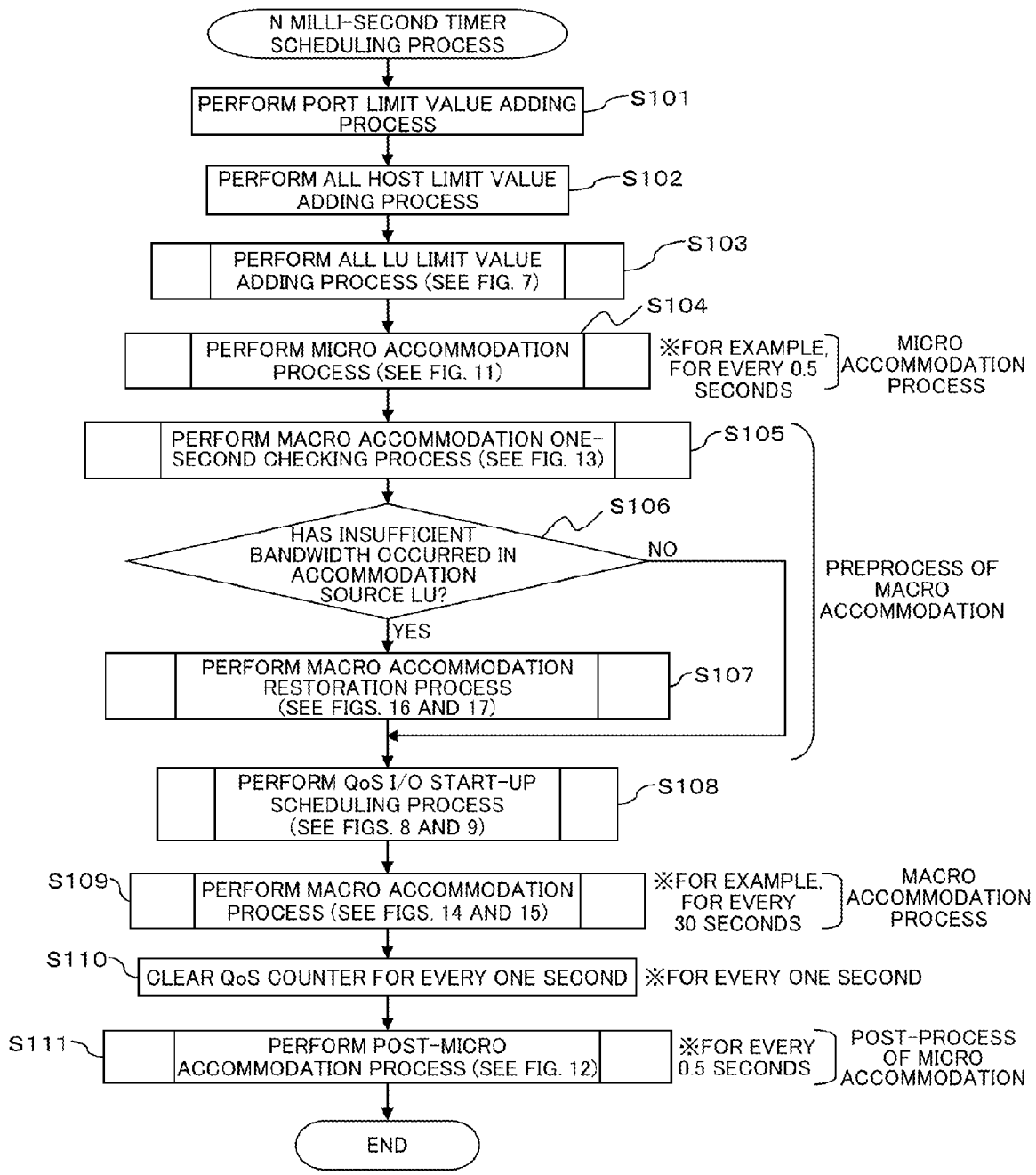
FIG. 6 is a flowchart that illustrates the processing sequence of an N-milli-second timer scheduling process according to this embodiment.

After the QoS I/O startup scheduling process performed by the scheduling unit 506 (see FIG. 6), the post-accommodation processing unit 543 operates in a case where the micro accommodation presence flag (see FIG. 3) of the QoS control area 213 is set to On. The post-accommodation processing unit 543, for every one micro cycle, performs an addition/subtraction process for the limits of the standby LU and the residual LU based on the micro accommodation unit number $N_H$ and the accommodation flags $F_{MICIN}$ and $F_{MICOUT}$ and performs the micro bandwidth accommodation at the next N milli-second cycle. However, in this embodiment, as illustrated in FIG. 6, for every one second, a QoS counter relating to the QoS control process is cleared so as to be suppressed not to exceed a numerical range that can be maintained in the memory for the QoS control. In order to respond to the clearing of the QoS counter, the post-accommodation processing unit 543 performs mutually-different processes at the QoS counter clearing timing for every one second and at the other timing. The process performed by the post-accommodation processing unit 543 at each timing will be described later with reference to FIG. 12. The post-accommodation processing unit 543 performs the post-process of micro accommodation as described above in a processing sequence that will be described in detail with reference to FIG. 12.

[2] Operation of this Embodiment

Next, the operation of the storage apparatus 100 according to this embodiment, and more particularly, the processing sequence of the process performed by the storage apparatus 100 according to this embodiment will be described with reference to FIGS. 6 to 20.

[2-1] N Milli-second Timer Scheduling Process

First, the processing sequence of the N milli-second timer scheduling process performed by the SCSI target control unit 303 according to this embodiment will be described along a flowchart (Steps S101 to S111) illustrated in FIG. 6. Here, for example, N is 10, and the SCSI target control unit 303, for each port, performs the N milli-second timer scheduling process illustrated in FIG. 6 for every 10 milli-seconds. In this way, as described in detail with reference to FIGS. 7 to 9 and FIGS. 11 to 20, the QoS control (QoS I/O startup scheduling), the macro bandwidth accommodation, and the micro bandwidth accommodation are performed.

When the N milli-second timer scheduling process is started up, first, the calculation unit 505 respectively adds the N milli-second I/O number and the N milli-second block number to the limit I/O number and the limit block number that are limits of each port. The port limits of each port as the result of the addition are overwritten and stored in the QoS management table 501 in Step S101. The limit I/O number and the limit block number added to the port limits are the values of N/1000 (1/100 in the case of N=10) of the QoS settings (the bandwidth value illustrated in FIG. 4) (see FIG. 5).

In addition, the calculation unit 505 adds the N milli-second I/O number and the N milli-second block number to the limit I/O number and the limit block number that are limits of all the hosts 10. The all-host limits that are the results of the addition are overwritten and stored in the QoS management table 501 in Step S102. The limit I/O number and the limit block number that are added to each host limit value are the values of N/1000 (1/100 in the case of N=10) of the QoS settings (bandwidth values illustrated in FIG. 4) (see FIG. 5).

Figure 7:
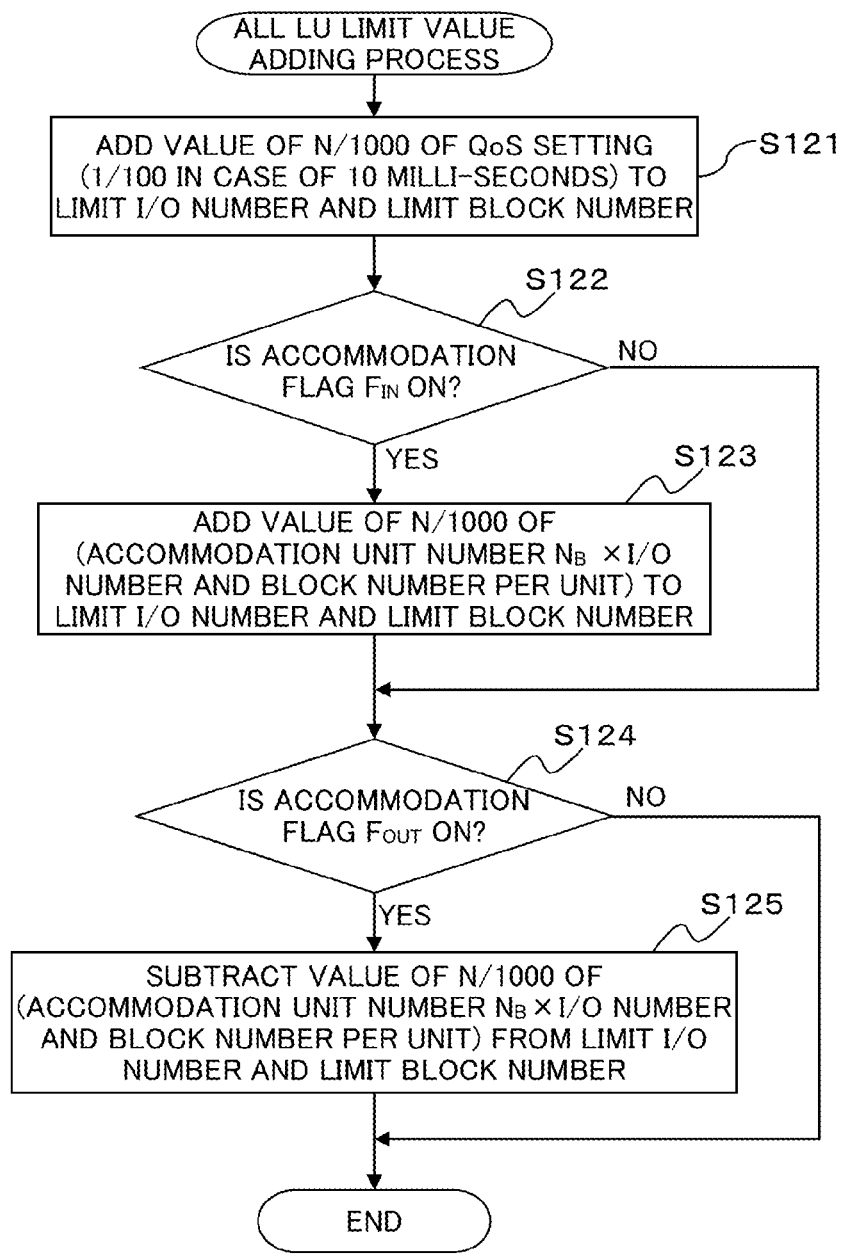
FIG. 7 is a flowchart that illustrates the processing sequence of an all-LU limits adding process according to this embodiment.

Furthermore, in this embodiment, since the LU is set as the bandwidth accommodation target, the calculation unit 505, for each of all the LUs, performs an all-LU limits adding process illustrated in FIG. 7 in Step S103. Here, the processing sequence of the all-LU limits adding process will be described along a flowchart (Steps S121 to S125) illustrated in FIG. 7.

As illustrated in FIG. 7, the calculation unit 505 adds the N milli-second I/O number and the N milli-second block number to the limit I/O number and the limit block number that are limits of all the LUs. All the host limits that are results of addition are overwritten and stored in the QoS management table 501 in Step S121. The limit I/O number and the limit block number added to each host limit are the values of N/1000 (in the case of N=10, 1/100) of the QoS settings (the bandwidth value illustrated in FIG. 4) (see FIG. 5).

Then, the calculation unit 505 determines whether or not the accommodation flag $F_{IN}$ of each LU is On by referring to the QoS control area 213 in Step S122. In a case where the accommodation flag $F_{IN}$ is On (Yes route of Step S122), in other words, in a case where the target LU is a accommodation destination LU receiving the macro bandwidth accommodation, the calculation unit 505 further performs an addition process as below in Step S123.

The calculation unit 505 further adds an I/O number corresponding to the accommodation unit number $N_B$ stored in the QoS control area 213 to the limit I/O number that is the limit of the target LU. More specifically, the value of N/1000 of [accommodation unit number $N_B$]×[number of I/Os per unit] is added to the limit I/O number. Similarly, the calculation unit 505 further adds an I/O number corresponding to the accommodation unit number $N_B$ of the QoS control area 213 to the limit block number that is the limit of the target LU. More specifically, the value of N/1000 of [accommodation unit number $N_B$]×[number of blocks per unit] is added to the limit block number. The results of the addition are overwritten and stored in the QoS management table 501.

After the process of Step S123 or in a case where the accommodation flag $F_{IN}$ is Off (No route of Step S122), the calculation unit 505 determines whether or not the accommodation flag $F_{OUT}$ of each LU is On by referring to the QoS control area 213 in Step S124. In a case where the accommodation flag $F_{OUT}$ is On (Yes route of Step S124), in other words, the target LU is a accommodation source LU per-forming the macro bandwidth accommodation, the calculation unit 505 further performs a subtraction process as below in Step S125.

The calculation unit 505 subtracts an I/O number corresponding to the accommodation unit number $N_B$ stored in the QoS control area 213 from the limit I/O number that is the limit of the target LU. More specifically, the value of N/1000 of [accommodation unit number $N_B$]×[I/O number per unit] is subtracted from the limit I/O number. Similarly, the calculation unit 505 subtracts a block number corresponding to the accommodation unit number $N_B$ stored in the QoS control area 213 from the limit block number that is the limit of the target LU. More specifically, the value of N/1000 of [accommodation unit number $N_B$]×[block number per unit] is subtracted from the limit block number. The results of subtraction is overwritten and stored in the QoS management table 501.

After the process of Step S125 or in a case where the accommodation flag $F_{OUT}$ is Off (No route of Step S124), the calculation unit 505 ends the all-LU limits adding process.

By performing the all-LU limits adding process (Steps S103 and S121 to S125) as described above every N milli-seconds, the macro bandwidth accommodation is executed every N milli-seconds. In addition, in a case where the host 10 is set as the bandwidth accommodation target, the calculation unit 505, for each of all the hosts, performs an all-host limits adding process similar to the all-LU limit adding process illustrated in FIG. 7 in Step S102.

When the limit value adding process (Steps S101 to S103) is completed, as illustrated in FIG. 6, the micro accommodation process performed by the fourth determination unit 541 and the accommodation processing unit 542 is performed, for example, for every 0.5 seconds (one micro cycle) in Step S104. The micro accommodation process performed by the fourth determination unit 541 and the accommodation processing unit 542 will be described later with reference to FIG. 11.

Then, after the macro accommodation one-second check-ing process performed by the macro accommodation check-ing unit 510 is performed every one second in Step S105, it is determined whether or not processing bandwidth insuffi-ciency occurs in the accommodation source LU by the third determination unit 531 every N milli-seconds in Step S106. In a case where the processing bandwidth insufficiency occurs in the accommodation source LU (Yes route of Step S106), in other words, in a case where a accommodation restoration LU is present, the macro accommodation resto-ration process is performed by the restoration processing unit 532 in Step S107. The process of Steps S105 to S107 described above correspond to the preprocess of macro accommodation. In addition, the macro accommodation one-second checking process performed by the macro accommodation checking unit 510 will be described later with reference to FIG. 13, and the macro accommodation restoration process performed by the restoration processing unit 532 will be described later with reference to FIGS. 16 and 17.

After the process of Step S107 or in a case where the accommodation restoration LU is not present (No route of Step S106), the scheduling unit 506 performs the QoS I/O startup scheduling process in Step S108. The QoS I/O startup scheduling process will be described later with reference to FIGS. 8 and 9.

Next, the macro accommodation process performed by the macro accommodation processing unit 520 is performed, for example, every 30 seconds (one macro cycle) in Step S109, and the QoS counter relating to the QoS control process is cleared every one second in Step S110. By clearing the QoS counter, the counter is suppressed not to exceed a numerical range that can be maintained in the memory for the QoS control. Subsequently, the post-process of micro accommodation performed by the post-accommodation processing unit 543 is performed, for example, every 0.5 seconds (one micro cycle) in Step S111, and the process corresponding to one cycle (every N milli-seconds) of the N milli-second timer scheduling process is completed. The macro accommodation process performed by the macro accommodation processing unit 520 will be described later with reference to FIGS. 14 and 15. In addition, the post-process of micro accommodation performed by the post-accommodation processing unit 543 will be described later with reference to FIG. 12.

[2-2] QoS I/O Startup Scheduling Process

Figure 8:
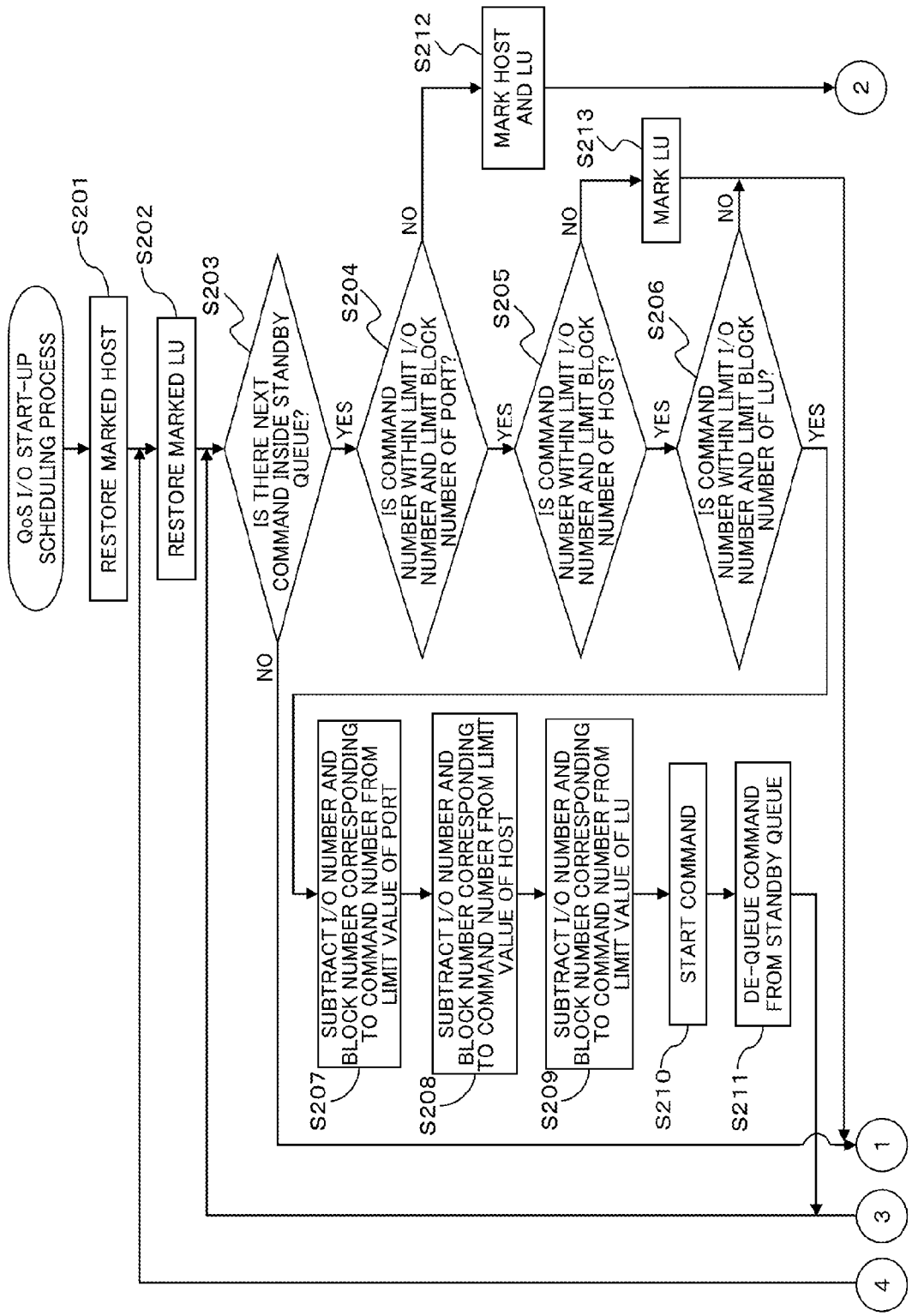
FIG. 8 is a flowchart that illustrates the processing sequence of a QoS input/output (I/O) startup scheduling process according to this embodiment.
Figure 9:
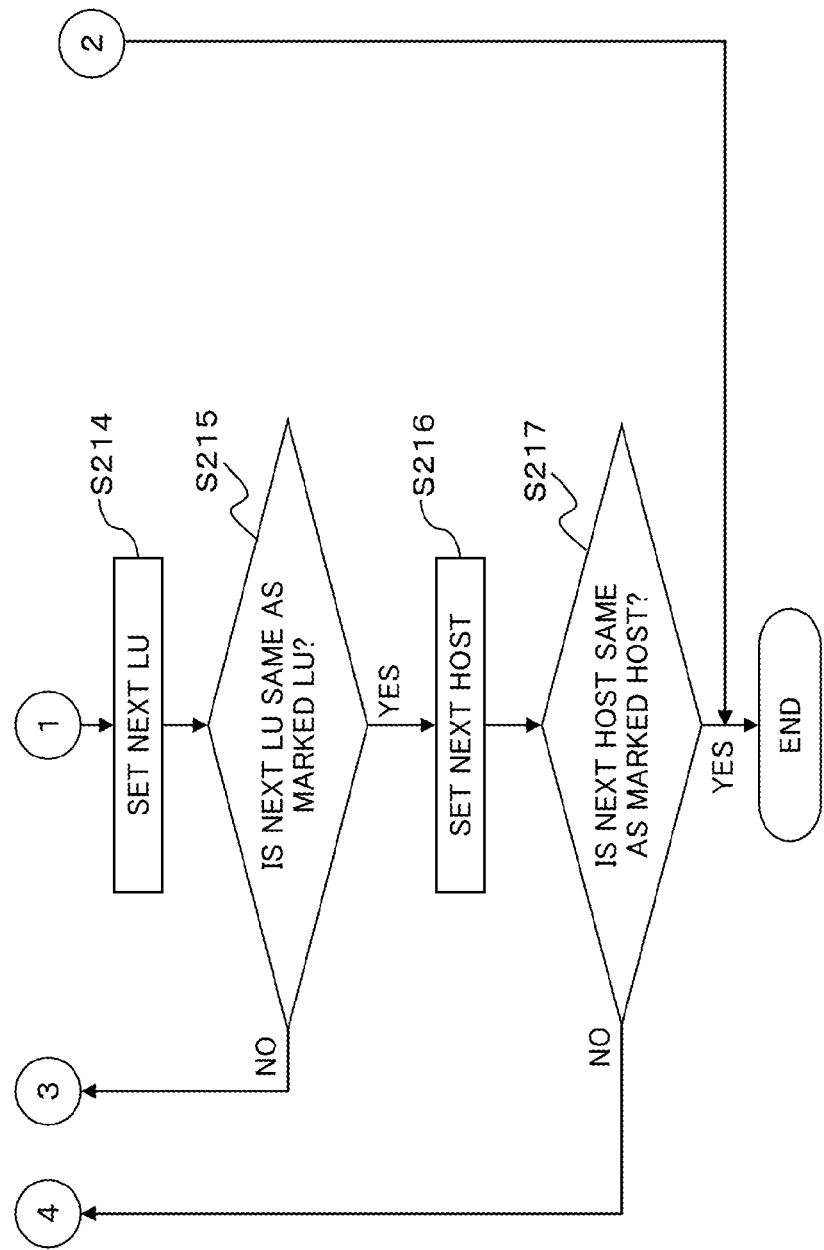
FIG. 9 is a flowchart that illustrates the processing sequence of the QoS I/O startup scheduling process according to this embodiment.

Next, the processing sequence of the QoS I/O startup scheduling process (Step S108 illustrated in FIG. 6) performed by the scheduling unit 506 according to this embodiment will be described in detail along a flowchart (Steps S201 to S217) illustrated in FIGS. 8 and 9. In the QoS I/O startup scheduling process, in a case where a command is waiting inside a standby queue arranged for each LU, as described below, the command disposed inside the standby queue is executed based on the limit I/O number and the limit block number of the LU.

The scheduling unit 506 recovers a marked host in Step S201. Subsequently, the scheduling unit 506 recovers a marked LU in step S202. Then, the scheduling unit 506 determines whether or not a next command is present inside the standby queue storing unit 502 in Step S203.

Here, in a case where it is determined that the next command is present inside the standby queue storing unit 502 (Yes route of Step S203), the scheduling unit 506 determines whether or not the command number is within the limit I/O number and the limit block number of the port in Step S204. Then, in a case where it is determined that the command number is within the limit I/O number and the limit block number of the port (Yes route of Step S204), the scheduling unit 506 determines whether or not the command number is within the limit I/O number and the limit block number of the host in Step S205.

Here, in a case where it is determined that the command number is within the limit I/O number and the limit block number of the host (Yes route of Step S205), the scheduling unit 506 determines whether or not the command number is within the limit I/O number and the limit block number of the LU in Step S206. Then, in a case where it is determined that the command number is within the limit I/O number and the limit block number of the LU (Yes route of Step S206), the scheduling unit 506 subtracts an I/O number and a block number corresponding to the command from the limits (the limit I/O number and the limit block number) of the port in Step S207.

In addition, the scheduling unit 506 subtracts the I/O number and the block number corresponding to the command from the limits (the limit I/O number and the limit block number) of the host in Step S208. Subsequently, the scheduling unit 506 subtracts the I/O number and the block number corresponding to the command from the limits (the limit I/O number and the limit block number) of the LU in Step S209. Then, the execution unit 507 starts up the command in Step S210. In addition, after starting up the command, the execution unit 507 dequeues the command from the standby queue storing unit 502 in Step S211. After this process, the storage apparatus 100 proceeds to Step S203.

On the other hand, in a case where it is determined that the command number is not within the limit I/O number and the limit block number of the port (No route of Step S204), the scheduling unit 506 marks the host and the LU in Step S212, and the process ends. In addition, in a case where it is determined that the command number is not within the limit I/O number and the limit block number of the host (No route of Step S205), the scheduling unit 506 marks the LU in Step S213, and the process proceeds to Step S214.

On the other hand, in a case where it is determined that a next command is not present inside the standby queue storing unit 502 (No route of Step S203) by the scheduling unit 506, the process proceeds to Step S214. In addition, in a case where it is determined that the command number is not within the limit I/O number and the limit block number of the LU (No route of Step S206) by the scheduling unit 506, the process proceeds to Step S214.

In Step S214, the scheduling unit 506 sets the next LU. Then, the scheduling unit 506 determines whether or not the next LU is the same as the marked LU in Step S215. Here, in a case where the scheduling unit 506 determines that the next LU is not the same as the marked LU (No route of Step S215), the process proceeds to Step S203.

On the other hand, in a case where it is determined that the next LU is the same as the marked LU (Yes route of Step S215), the scheduling unit 506 sets the next host in Step S216. Subsequently, the scheduling unit 506 determines whether or not the next host is the same as the marked host in Step S217. Here, in a case where it is determined that the next host is not the same as the marked host by the scheduling unit 506 (No route of Step S217), the process proceeds to Step S202. On the other hand, in a case where it is determined that the next host is the same as the marked host by the scheduling unit 506 (Yes route of Step S217), the process ends.

[2-3] Process at Time of Reception of Command

Here, the processing sequence of the command reception process performed by the command reception unit 504 according to this embodiment will be described in detail along a flowchart (Steps S301 to S309) illustrated in FIG. 10. The storage apparatus 100 performs this command reception process, for example, being triggered upon the caption of a command. In the command reception process, when a command is received from the host, as described below, the received command is instantly executed in accordance with the limit I/O number and the limit block number or is enqueued in the standby queue.

Figure 10:
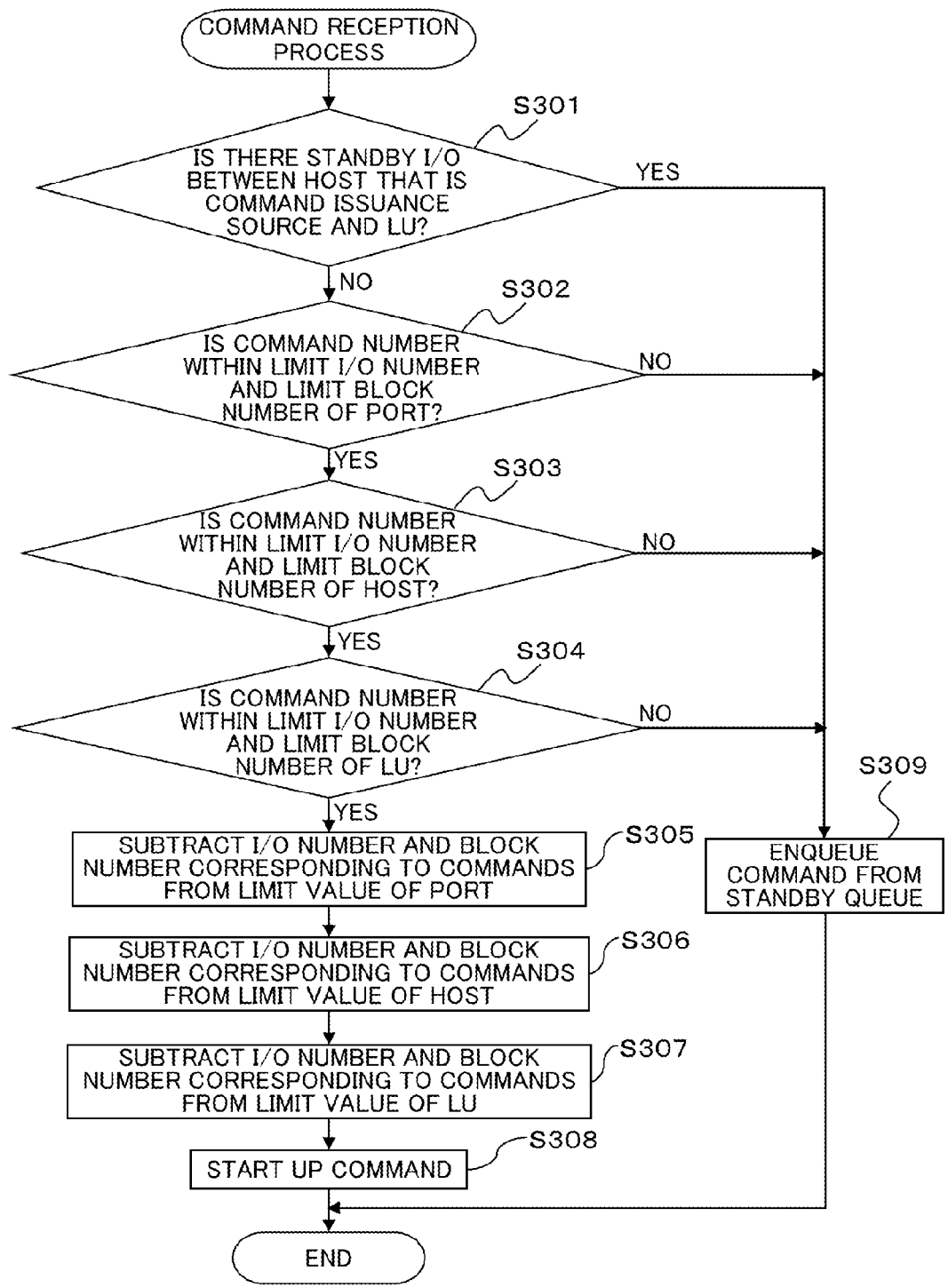
FIG. 10 is a flowchart that illustrates the processing sequence of a command reception process performed by the storage apparatus according to this embodiment.

As illustrated in FIG. 10, the command reception unit 504 determines whether or not a standby I/O is present between the host that is the issuance source of the received command and the LU in Step S301. Here, in a case where it is determined that there is no standby I/O between the host that is the issuance source and the LUN by the command reception unit 504 (No route of Step S301), the scheduling unit 506 performs the following process. The scheduling unit 506 determines whether or not the command number is within the limit I/O number and the limit block number of the port in Step S302. Then, in a case where it is determined that the command number is within the limit I/O number and the limit block number of the port (Yes route of Step S302), the scheduling unit 506 determines whether or not the command number is within the limit I/O number and the limit block number of the host in Step S303.

Here, in a case where it is determined that the command number is within the limit I/O number and the limit block number of the host (Yes route of Step S303), the scheduling unit 506 determines whether or not the command number is within the limit I/O number and the limit block number of the LU in Step S304. Then, in a case where it is determined that the command number is within the limit I/O number and the limit block number of the LU (Yes route of Step S304), the scheduling unit 506 subtracts an I/O number and a block number corresponding to the command from the limits (the limit I/O number and the limit block number) of the port in Step S305.

In addition, the scheduling unit 506 subtracts the I/O number and the block number corresponding to the command from the limits (the limit I/O number and the limit block number) of the host in Step S306. Subsequently, the scheduling unit 506 subtracts the I/O number and the block number corresponding to the command from the limits (the limit I/O number and the limit block number) of the LU in Step S307. In addition, the execution unit 507 starts up the command in Step S308. After the process of the Step S308 ends, the storage apparatus 100 ends the process.

On the other hand, in a case where it is determined that a standby I/O is present between the host that is the issuance source of the received command and the LU by the command reception unit 504 (Yes route of Step S301), the process proceeds to Step S309. In addition, in a case where it is determined that the command number is not within the limit I/O number and the limit block number of the port by the scheduling unit 506 (No route of Step S302), the process proceeds to Step S309. Furthermore, in a case where it is determined that the command number is not within the limit I/O number and the limit block number of the host by the scheduling unit 506 (No route of Step S303), the process proceeds to Step S309. In addition, in a case where it is determined that the command number is not within the limit I/O number and the limit block number of the LU by the scheduling unit 506 (No route of Step S304), the process proceeds to Step S309. Then, the command reception unit 504, in Step S309, enqueues the command in the standby queue storing unit 502, and the process ends.

[2-4] Micro Accommodation Process

Next, the micro accommodation process (Step S104 illustrated in FIG. 6) performed by the micro accommodation processing unit 540 (the fourth determination unit 541 and the accommodation processing unit 542) according to this embodiment will be described along a flowchart (Steps S401 to S411) illustrated in FIG. 11. The micro accommodation process is performed every one micro cycle (for example 0.5 seconds=500 milli-seconds) before the QoS I/O startup scheduling process performed by the scheduling unit 506 while the N milli-second timer scheduling process illustrated in FIG. 6 is performed for every N milli-seconds.

As illustrated in FIG. 11, when the micro accommodation processing unit 540 is started up every 0.5 seconds, first, for each LU, the accommodation flags $F_{MICIN}$ and $F_{MICOUT}$ stored in the QoS control area 213 are cleared to be in the Off state in Step S401. In addition, the micro accommodation processing unit 540, for each LU, the micro accommodation unit number $N_H$ stored in the QoS control area 213 is cleared to be zero in Step S402. In this way, all the information relating to the micro bandwidth accommodation process of the previous time is cleared. Accordingly, the micro bandwidth accommodation with a accommodation amount according to the value of the micro accommodation unit number $N_H$ is performed only once (one micro cycle).

In other words, the fourth determination unit 541, for each LU, determines whether or not the standby unit number corresponding to the processing amount relating to I/Os for the LU is equal to or more than a predetermined times (for example, four times) of the processing bandwidth (bandwidth value/set value) of the LU in Step S403. The standby unit number is a value converted from the standby I/O number $N_C$ and the standby block number $N_D$ stored in the QoS control area 213. Then, in a case where the standby unit number is the predetermined times of the set value or more (Yes route in Step S403), the accommodation processing unit 542 inserts the standby unit number of the target LU of this time into an appropriate position in the standby unit array (list) in which standby units are aligned in order of greatest to lowest standby unit numbers in Step S404. The standby unit array (list) for the micro bandwidth accommodation, for example, is generated inside the QoS control area 213 and stores the LUN specifying a LU and the standby unit number of the LU in association with each other. In this embodiment, the "accommodation LU number in one cycle" in the micro bandwidth accommodation, for example, is set to 4 LUs, and accordingly, four is sufficient as the number of elements of the standby unit array.

After the process of Step S404 or in a case where the standby unit number is less than the predetermined times of the set value (No route of Step S403), the accommodation processing unit 542 determines whether or not the determination of a unit number has been performed for all the LUs in Step S405. In a case where the determination of a unit number has not been performed for all the LUs (No route of Step S405), the micro accommodation processing unit 540 returns the process to Step S401. On the other hand, in a case where the determination of a unit number has been performed for all the LUs (Yes route of Step S405), the accommodation processing unit 542 determines whether or not a standby unit is present in the standby unit array for the micro bandwidth accommodation in Step S406.

In a case where a standby unit is present in the standby unit array (Yes route of Step S406), the accommodation processing unit 542 inserts the residual unit number of the LU that is the target of this time into an appropriate position in the residual unit array (list) in which residual units are aligned in order of greatest to lowest residual unit numbers in Step S407. The residual unit array (list) for the micro bandwidth accommodation, for example, is generated inside the QoS control area 213 and stores the LUN specifying a LU and the residual unit number of the LU in association with each other. As the residual unit number of the target LU, the residual unit number $N_I$ stored in the QoS control area 213 is read and used.

Thereafter, the accommodation processing unit 542 sequentially compares the standby unit number included in the standby unit array and the residual unit number included in the residual unit array in order of greatest to least and determines whether or not the standby unit number is the residual unit number or less in Step S408. In a case where the standby unit number is the residual unit number or less (Yes route of Step S408), the accommodation processing unit 542 determines the standby LU and the residual LU at this time as a combination of the standby LU and the residual LU for which the micro bandwidth accommodation is performed. In addition, in a case where the combination is determined, the standby LU and the residual LU included in the combination are respectively removed from the standby unit array and the residual unit array.

Then, the accommodation processing unit 542 sets the micro accommodation unit number $N_H$ accommodated from the residual LU in the QoS control area 213 of the standby LU of the determined combination and sets the accommodation flag $F_{MICIN}$, which represents that the standby LU receives micro bandwidth accommodation, to On. In addition, the accommodation processing unit 542, in the QoS control area 213 of the residual LU of the determined combination, sets the micro accommodation unit number $N_H$ to be accommodated to the standby LU and sets the accommodation flag $F_{MICIN}$, which represents that the standby LU receives the micro bandwidth accommodation, to On in Step S409.

In addition, when a combination of the standby LU and the residual LU for which the micro bandwidth accommodation is performed is determined in one set, the accommodation processing unit 542 sets the micro accommodation presence flag stored in the QoS control area 213 to On in Step S410 and notifies the post-accommodation processing unit 543 that the micro bandwidth accommodation is performed. Then, the accommodation processing unit 542 determines whether or not a standby unit is still present in the standby array in Step S411. In a case where a standby unit is present (Yes route of Step S411), the accommodation processing unit 542 returns the process to Step S408.

On the other hand, in a case where no standby unit is present (No route of Step S411), the micro accommodation processing unit 540 completes the micro accommodation process. In addition, in a case where the standby unit number is larger than the residual unit number (No route of Step S408), the micro accommodation processing unit 540 completes the micro accommodation process. Similarly, in a case where no standby unit is present in the standby unit array (No route of Step S406), the micro accommodation processing unit 540 completes the micro accommodation process.

[2-5] Post-Process of Micro Accommodation

Next, the processing sequence of the post-process of micro accommodation (Step S111 illustrated in FIG. 6) performed by the post-accommodation processing unit 543 according to this embodiment will be described along a flowchart (Steps S501 to S507) illustrated in FIG. 12. The post-process of micro accommodation is performed every one micro cycle (0.5 seconds) after the QoS I/O startup scheduling process performed by the scheduling unit 506 while the N milli-second timer scheduling process illustrated in FIG. 6 is performed every N milli-seconds. Particularly, the post-process of micro accommodation, as illustrated in FIG. 6, is performed in a final step of Step S111 of the N milli-second timer scheduling process after the QoS I/O startup scheduling process and the macro accommodation process are performed, and the QoS counter is cleared every one second.

Figure 12:
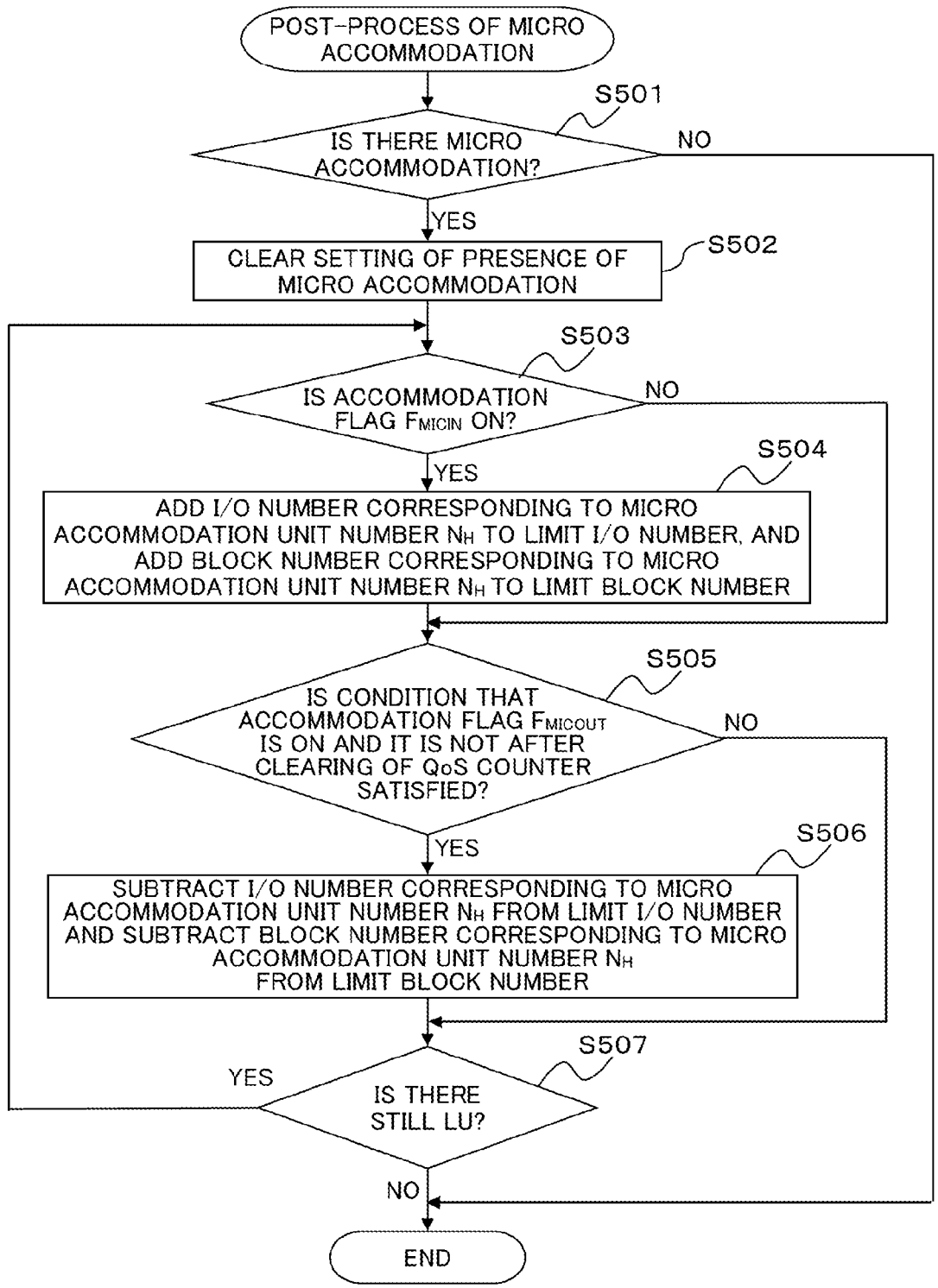
FIG. 12 is a flowchart that illustrates the processing sequence of a post-process of micro accommodation according to this embodiment.

As illustrated in FIG. 12, the post-accommodation processing unit 543, first, determines whether or not the micro accommodation presence flag stored in the QoS control area 213 is On in Step S501. In a case where the micro accommodation flag is Off (No route of Step S501), the post-accommodation processing unit 543 completes the post-process of micro accommodation without performing any process.

On the other hand, in a case where the micro accommodation presence flag is On (Yes route of Step S501), the post-accommodation processing unit 543 sets the micro accommodation flag stored in the QoS control area 213 to Off (after the setting of the micro accommodation presence is cleared) in Step S502. Thereafter, the post-accommodation processing unit 543, for each LU, determines whether or not the accommodation flag $F_{MICIN}$ is On in Step S503.

In a case where the accommodation flag $F_{MICIN}$ is On (Yes route of Step S503), in other words, the target LU is a standby LU, the post-accommodation processing unit 543 adds an I/O number corresponding to the micro accommodation unit number $N_H$ to the limit I/O number of the LU. In addition, the post-accommodation processing unit 543 adds a block number corresponding to the micro accommodation unit number $N_H$ to the limit block number of the LU in Step S504.

After the process of Step S504 or in a case where the accommodation flag $F_{MICIN}$ is Off (No route of Step S503), the post-accommodation processing unit 543 determines, for each LU, whether or not a predetermined determination condition described below is satisfied in Step S505. Here, the predetermined determination condition is a condition that the accommodation flag $F_{MICOUT}$ of the target LU is ON, and the timing is not after the clearing of the QoS counter performed every one second.

In a case where the predetermined determination condition is satisfied (Yes route of Step S505), in other words, the timing is not after the clearing of the QoS counter performed every one second, and the target LU is a residual LU, the post-accommodation processing unit 543 performs a subtraction process described below in Step S506. The post-accommodation processing unit 543 subtracts an I/O number corresponding to the micro accommodation unit number $N_H$ from the limit I/O number of the LU and subtracts a block number corresponding to the micro accommodation unit number $N_H$ from the limit block number of the LU.

In a case where the predetermined determination condition is not satisfied (No route of Step S505), in other words, in a case where the accommodation flag $F_{MICOUT}$ of the target LU is Off, and the timing is after the clearing of the QoS counter performed every one second, the post-accommodation processing unit 543 proceeds to the process of Step S507 without performing the subtraction process of Step S506. The reason for this is that, in a case where the timing is after the clearing of the QoS counter performed every one second, the QoS counter is cleared, and accordingly, the subtraction process does not need to be performed.

After the process of Step S506 or in a case where "No" is determined in Step S505, the post-accommodation processing unit 543 determines whether or not a LU that is the determination target is still present in Step S507. In a case where the LU that is the determination target is still present (Yes route of Step S507), the post-accommodation processing unit 543 returns the process to Step S503. On the other hand, in a case where no LU that is the determination target is present (No route of Step S507), the post-accommodation processing unit 543 completes the post-process of micro accommodation.

[2-6] Macro Accommodation One-Second Checking Process

Next, the macro accommodation one-second checking process (Step S105 illustrated in FIG. 6) performed by the macro accommodation checking unit 510 according to this embodiment will be described along a flowchart (Steps S601 to S608) illustrated in FIG. 13. In the macro accommodation one-second checking process, a minimum residual unit number $N_E$ and a minimum standby unit number $N_F$ that are information for determining whether or not the macro bandwidth accommodation is performed by using the first and second determination units 521 and 522 are acquired. In the macro accommodation one-second checking process, for example, is performed every one second while the N milli-second timer scheduling process illustrated in FIG. 6 is performed every N milli-seconds.

Figure 13:
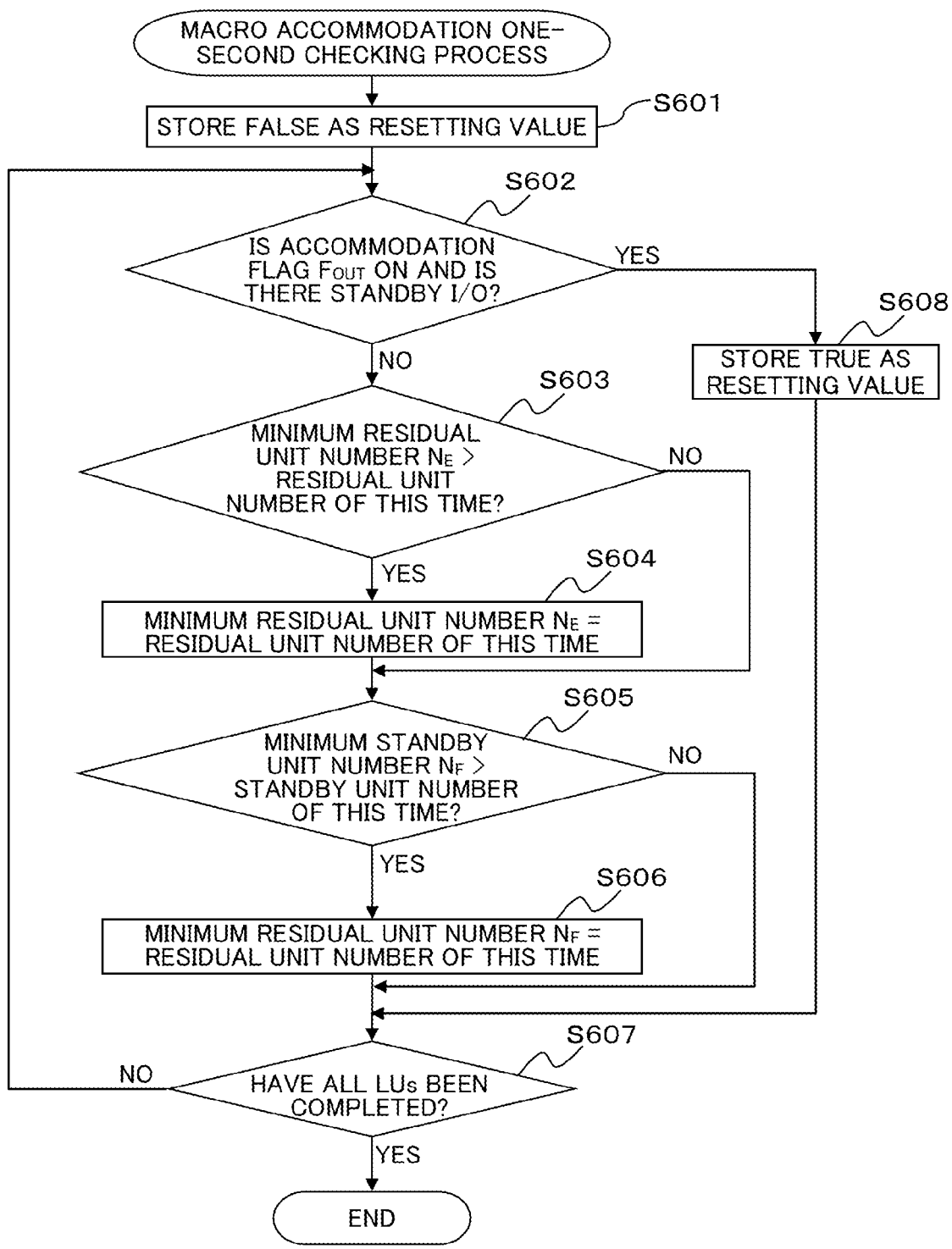
FIG. 13 is a flowchart that illustrates the processing sequence of a macro accommodation one-second checking process according to this embodiment.

As illustrated in FIG. 13, the macro accommodation checking unit 510, first, as a default value of the return value, stores "FALSE" in the QoS control area 213 and the like in Step S601. Here, the return value "FALSE" is information representing that the accommodation restoration LU returning a accommodation amount through the macro bandwidth accommodation is not present. Thereafter, the macro accommodation checking unit 510 performs the following process (Steps S602 to S608) for each LU.

The macro accommodation checking unit 510 determines whether the accommodation flag $F_{OUT}$ of the target LU is On and a standby I/O is present in the target LU, in other words, whether the target LU is a restoration source LU and is a accommodation restoration LU in which the processing bandwidth insufficiency occurs in Step S602.

In a case where the target LU is a accommodation restoration LU (Yes route of Step S602), the macro accommodation checking unit 510 stores "TRUE" as a return value in the QoS control area 213 and the like in Step S608. Here, the return value "TRUE" is information representing that a accommodation restoration LU is present. Thereafter, the macro accommodation checking unit 510 proceeds to the process of Step S607.

In a case where the target LU is not a accommodation restoration LU (No route of Step S602), the second acquisition unit 512 acquires the current residual unit number $N_I$ of the LU. The residual unit number $N_I$ of each LU is acquired by referring to the residual unit number $N_I$ of each LU that is stored in the QoS control area 213. Then, the second acquisition unit 512 compares the residual unit number $N_I$ acquired this time and the value (the minimum residual unit number until the current time point) $N_E$ stored in the QoS control area 213 with each other in Step S603.

In a case where the residual unit number $N_I$ acquired this time is less than the value $N_E$ (Yes route of Step S603), the second acquisition unit 512 replaces the value $N_E$ with the residual unit number $N_I$ acquired this time in Step S604.

After the process of Step S604 or in a case where the residual unit number $N_I$ acquired this time is the value $N_E$ or more (No route of Step S603), the first acquisition unit 511 acquires the current standby unit number of the LU. The standby unit number of each LU, as described above, is a value converted from the standby I/O number $N_C$ and the standby block number $N_D$ of the target LU. Then, the first acquisition unit 511 compares the standby unit number acquired this time and the value (the minimum standby unit number until the current time point) $N_F$ stored in the QoS control area 213 with each other in Step S605.

In a case where the standby unit number acquired this time is less than the value $N_F$ (Yes route of Step S605), the first acquisition unit 511 replaces the value $N_F$ with the standby unit number acquired this time in Step S606.

After the process of Step S606 or S608 or in a case where the standby unit number acquired this time is the value $N_F$ or more (No route of Step S605), the macro accommodation checking unit 510 determines whether or not the macro accommodation one-second checking process has been completed for all the LUs in Step S607. In a case where the checking process has not been completed for all the LUs (No route of Step S607), the macro accommodation checking unit 510 returns the process to Step S602. On the other hand, in a case where the checking process has been completed for all the LUs (Yes route of Step S607), the macro accommodation checking unit 510 ends the macro accommodation one-second checking process.

By performing the macro accommodation one-second checking process as above every one second within one macro cycle (30 seconds), the value $N_E$ that is finally stored in the QoS control area 213 becomes the minimum residual unit number $N_E$ during one macro cycle. Similarly, the value $N_F$ that is finally stored in the QoS control area 213 becomes the minimum standby unit number $N_F$ during one macro cycle. Here, the process of Steps S603 and S604 and the process of Steps S605 and S606 may be performed in reverse order.

[2-7] Macro Accommodation Process

Figure 14:
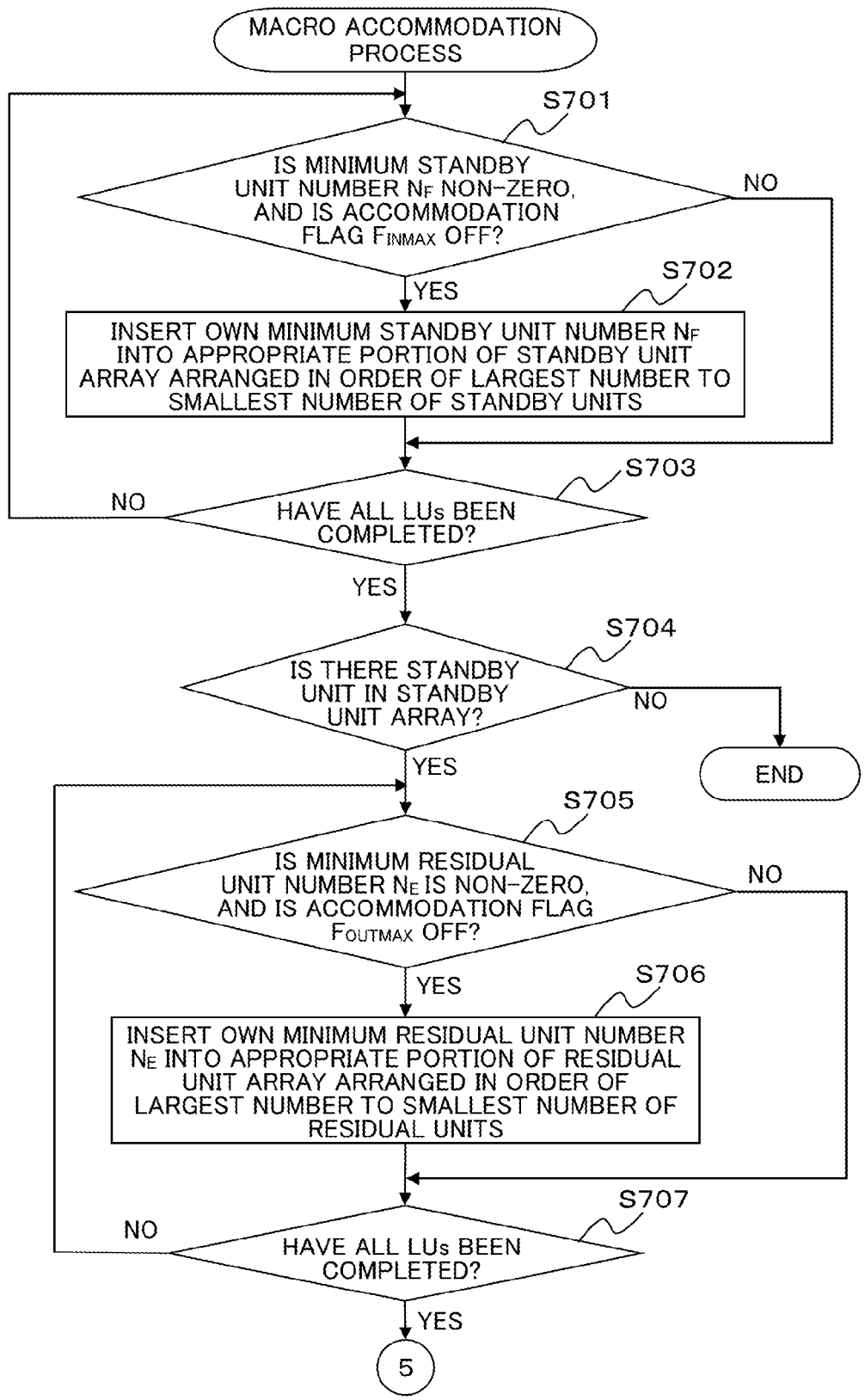
FIGS. 14 and 15 represent a flowchart that illustrates the processing sequence of a macro accommodation process according to this embodiment.
Figure 15:
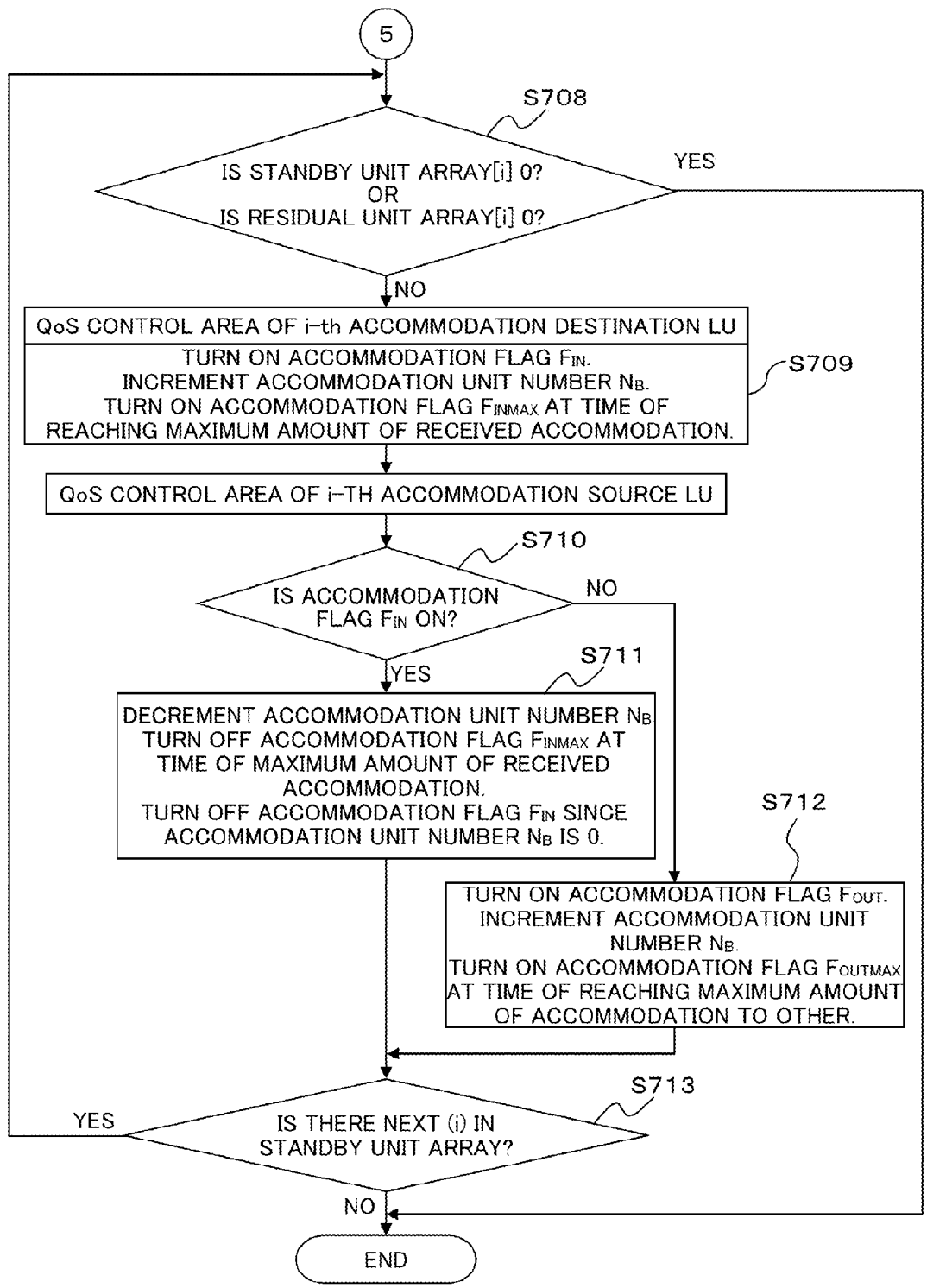

Next, the processing sequence of the macro accommodation process (Step S109 illustrated in FIG. 6) performed by the macro accommodation processing unit 520 according to this embodiment will be described along a flowchart (Steps S701 to S713) illustrated in FIGS. 14 and 15. The macro accommodation process is performed every one macro cycle (for example 30 seconds) after the QoS I/O startup scheduling process performed by the scheduling unit 506 while the N milli-second timer scheduling process illustrated in FIG. 6 is performed for every N milli-seconds. In the macro accommodation process, after the QoS I/O startup scheduling, at the timing for every one macro cycle, the macro bandwidth accommodation is performed from a LU continuously having room for the processing bandwidth to spare to a LU continuously having insufficiency of the processing bandwidth.

First, the first determination unit 521, for each LU, determines whether the minimum standby unit number $N_F$ of the LU is a value other than zero, and the accommodation flag $F_{INMAX}$ of the LU is Off in Step S701. Here, in a case where the minimum standby unit number $N_F$ of the LU is a value other than zero, the LU is constantly in the standby state at the one-second notch timing in one macro cycle. Accordingly, the LU is regarded to be in the insufficient state of the processing bandwidth for one macro cycle, and, in this embodiment, and it is determined that the above-described "condition for receiving accommodation" is satisfied. However, in a case where the accommodation flag $F_{INMAX}$ of the LU is On, the accommodation amount of the macro bandwidth accommodation received from the other LUs has arrived at the upper limit in the LU, and the macro bandwidth accommodation is not able to be performed. Thus, in this embodiment, for each LU, it is determined whether the minimum standby unit number $N_F$ of the LU is a value other than zero, and the accommodation flag $F_{INMAX}$ of the LU is Off.

In a case where the minimum standby unit number $N_F$ of the LU is a value other than zero and the accommodation flag $F_{INMAX}$ of the LU is Off (Yes route of Step S701), the first determination unit 521 inserts the minimum standby unit number $N_F$ of the target LU of this time into an appropriate position in the standby unit array aligned in order of greatest to least standby unit numbers in Step S702. The standby unit array for the macro bandwidth accommodation, for example, is generated inside the QoS control area 213 and stores the LUN specifying a LU and the minimum standby unit number $N_F$ of the LU in association with each other. In this embodiment, the "accommodation LU number in one cycle" in the macro bandwidth accommodation, for example, is set to 4 LUs, and accordingly, four is sufficient as the number of elements of the standby unit array.

After the process of Step S702 or in a case where the minimum standby unit number $N_F$ of the LU is zero, or the accommodation flag $F_{INMAX}$ of the LU is On (No route of Step S701), the first determination unit 521 determines whether or not the determination of the minimum standby unit number $N_F$ has been performed for all the LUs in Step S703. In a case where the determination of a standby unit number has not been performed for all the LUs (No route of Step S703), the first determination unit 521 returns the process to Step S701. On the other hand, in a case where the determination of a standby unit number has been performed for all the LUs (Yes route of Step S703), the macro accommodation processing unit 520 determines whether or not a standby unit is present in the standby unit array for the macro bandwidth accommodation in Step S704. In a case where a standby unit is present in the standby unit array for the macro bandwidth accommodation (No route of Step S704), the macro accommodation processing unit 520 completes the macro accommodation process.

On the other hand, in a case where a standby unit is present in the standby unit array for the macro bandwidth accommodation (Yes route of Step S704), the second determination unit 522, for each LU, determines whether the minimum residual unit number $N_E$ of the LU is a value other than zero, and the accommodation flag $F_{OUTMAX}$ of the LU is Off in Step S705. Here, in a case where the minimum residual unit number $N_E$ of the LU is a value other than zero, the LU is constantly in a residual state at the one-second notch timing in one macro cycle. Accordingly, the LU is regarded to be in a state in which there is room for the processing bandwidth to spare continuously in one macro cycle, and, in this embodiment, it is determined that the above-described "condition for accommodation" is satisfied. However, in a case where the accommodation flag $F_{OUTMAX}$ of the LU is On, the accommodation amount of the macro bandwidth accommodation for another LU arrives at the lower limit in the LU, and the macro bandwidth accommodation is not able to be performed. Thus, in this embodiment, for each LU, it is determined whether the minimum residual unit number $N_E$ of the LU is a value other than zero, and the accommodation flag $F_{OUTMAX}$ of the LU is Off.

In a case where the minimum residual unit number $N_E$ of the LU is a value other than zero, and the accommodation flag $F_{OUTMAX}$ of the LU is Off (Yes route of Step S705), the second determination unit 522 inserts the minimum residual unit number $N_E$ of the target LU of this time into an appropriate position in the residual unit array aligned in order of greatest to least residual unit numbers in Step S706. The residual unit array for the macro bandwidth accommodation, for example, is generated inside the QoS control area 213 and stores the LUN specifying a LU and the minimum residual unit number $N_E$ of the LU in association with each other. In this embodiment, the "accommodation LU number in one cycle" in the macro bandwidth accommodation, for example, is set to 4 LUs, and accordingly, four is sufficient as the number of elements of the standby unit array.

After the process of Step S706 or in a case where the minimum residual unit number $N_E$ of the LU is zero, or the accommodation flag $F_{OUTMAX}$ of the LU is On (No route of Step S705), the second determination unit 522 determines whether or not the determination of the minimum residual unit number $N_E$ has been performed for all the LUs in Step S707. In a case where the determination of a standby unit number has not been performed for all the LUs (No route of Step S707), the second determination unit 522 returns the process to Step S705.

In a case where the determination of a standby unit number has been performed for all the LUs (Yes route of Step S707), the macro accommodation processing unit 520 determines whether the element [i] of the standby unit array is zero or the element [i] of the residual unit array is zero in Step S708. In a case where the element [i] of the standby unit array is zero or the element [i] of the residual unit array is zero (Yes route of Step S708), the macro accommodation processing unit 520 completes the macro accommodation process.

In a case where neither the element [i] of the standby unit array nor the element of the residual unit array is not zero (No route of Step S708), the macro accommodation processing unit 520 (change unit 523) performs the following process (Steps S709 to S713). Here, a accommodation destination LU relating to the i-th element [i] of the standby unit array and a accommodation source LU relating to the i-th element [i] of the residual unit array are set as one combination for which the macro bandwidth accommodation is performed. In this embodiment, since the number of elements of each array is four, for example, i is 0, 1, 2, or 3. The process of Steps S708 to S713 is performed in order of greatest to least standby unit numbers of residual unit numbers of each array.

Among the processes of Steps S709 to S713, the process of Step S709 is targeted for the QoS control area 213 of the accommodation destination LU. In addition, among the processes of Steps S709 to S713, the process of Steps S710 to S712 is targeted for the QoS control area 213 of the accommodation source LU.

The change unit 523 sets and changes the bandwidth accommodation information stored in the QoS control area 213 relating to the i-th accommodation destination LU of the standby unit array as below in Step S709. The change unit 523 sets the accommodation flag $F_{IN}$ of the i-th accommodation destination LU to On. In addition, the change unit 523 increments the accommodation unit number $N_B$ of the i-th accommodation destination LU by one. Accordingly, values (for example, 5 MB/s and 60 IOPS) corresponding to one unit are added to the bandwidth limits calculated for the accommodation destination LU (see Step S123 illustrated in FIG. 7). In addition, by incrementing the accommodation unit number $N_B$ by one, in a case where a accommodation amount from another LU arrives at the upper limit, the change unit 523 sets the accommodation flag $F_{INMAX}$ to On.

Then, the change unit 523 determines whether or not the accommodation flag $F_{IN}$ of the i-th accommodation source LU of the residual unit array is On in Step S710. In a case where the accommodation flag $F_{IN}$ is On (Yes route of Step S710), it is assumed that the i-th accommodation source LU has room for the processing bandwidth to spare but receives bandwidth accommodation from another LU. Thus, the change unit 523 sets and changes the bandwidth accommodation information, which is stored in the QoS control area 213, relating to the i-th accommodation source LU of the residual unit array as below in Step S711.

The change unit 523 decreases the accommodation unit number $N_B$ of the i-th accommodation source LU by one. Accordingly, values (for example, 5 MB/s and 60 IOPS) corresponding to one unit are subtracted from the bandwidth limits calculated for the accommodation source LU (see Step S123 illustrated in FIG. 7). In addition, in a case where the accommodation flag $F_{INMAX}$ of the i-th accommodation source LU is On, in other words, in a case where the accommodation amount accommodated from another LU arrives at the upper limit, the change unit 523 sets the accommodation flag $F_{INMAX}$ of the i-th accommodation source LU to Off. Furthermore, in a case where the accommodation unit number $N_B$ becomes zero in accordance with the decreasing of the accommodation unit number $N_B$ by one, the accommodation amount received by the i-th accommodation source LU from another LU is zero, and accordingly, the change unit 523 sets the accommodation flag $F_{IN}$ of the i-th accommodation source LU to Off.

In a case where the accommodation flag $F_{IN}$ of the i-th accommodation source LU is Off (NO route of Step S710), the change unit 523 sets and changes the bandwidth accommodation information, which is stored in the QoS control area 213, relating to i-th the accommodation source LU as below in Step S712. The change unit 523 sets the accommodation flag $F_{OUT}$ of the i-th accommodation source LU to On. In addition, the change unit 523 increments the accommodation unit number $N_B$ of the i-th accommodation source LU by one. Accordingly, values (for example, 5 MB/s and 60 IOPS) corresponding to one unit are subtracted from the bandwidth limits calculated for the accommodation source LU (see Step S125 illustrated in FIG. 7). Furthermore, in a case where the accommodation amount of the macro bandwidth accommodation received from another LU arrives at the upper limit in accordance with the incrementing of the accommodation unit number $N_B$ by one, the change unit 523 sets the accommodation flag $F_{INMAX}$ to On.

After the process of Step S711 or S712, the macro accommodation processing unit 520 determines whether or not a next element [i] is present in the standby unit array for the macro bandwidth accommodation in Step S713. In a case where the next element [i] is present (Yes route of Step S713), the macro accommodation processing unit 520 returns the process to Step S708. On the other hand, in a case where the next element [i] is not present (No route of Step S713), the macro accommodation processing unit 520 completes the macro accommodation process.

[2-8] Macro Accommodation Restoration Process

Figure 16:
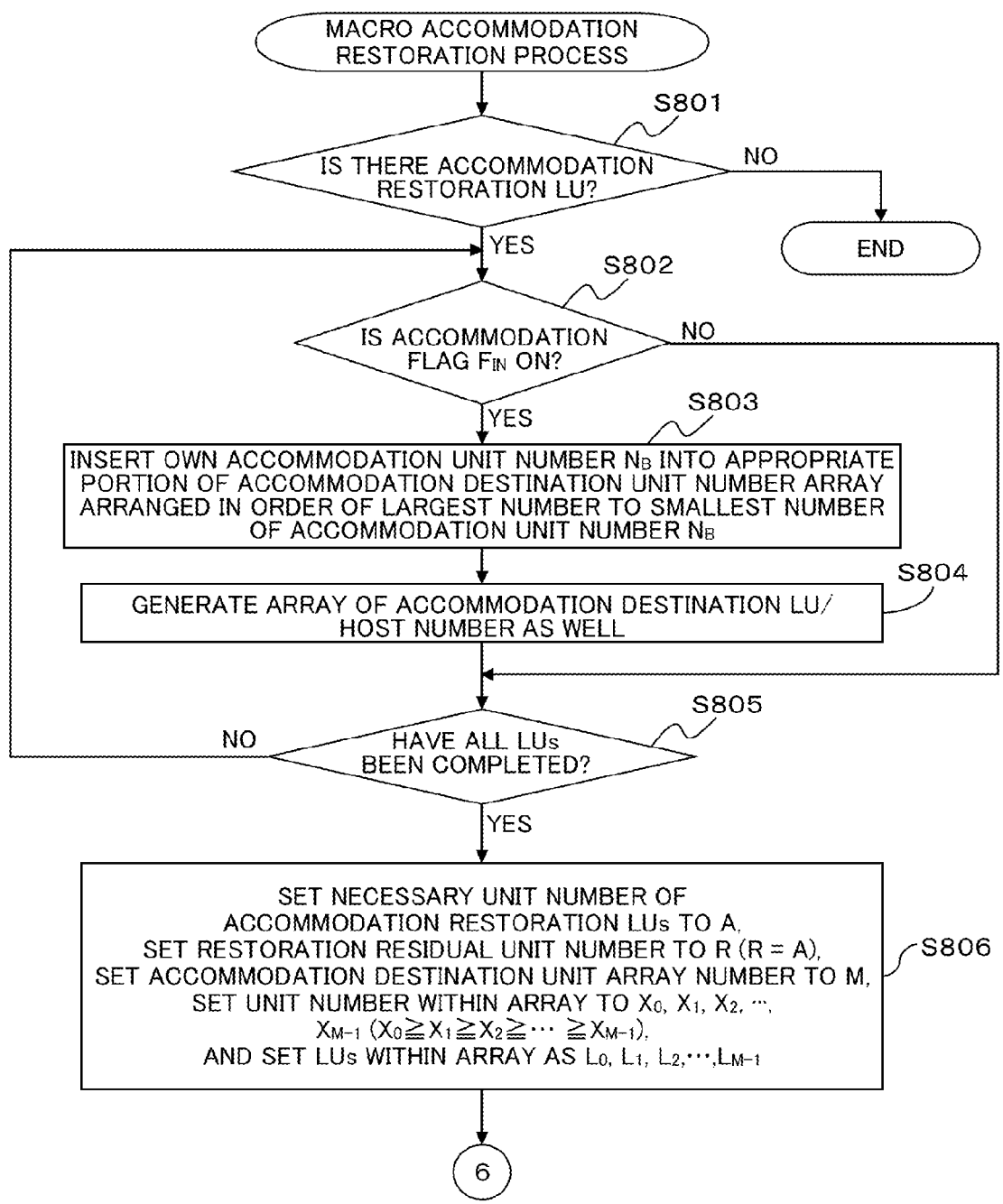
FIGS. 16 and 17 represent a flowchart that illustrates the processing sequence of a macro accommodation restoration process according to this embodiment.
Figure 17:
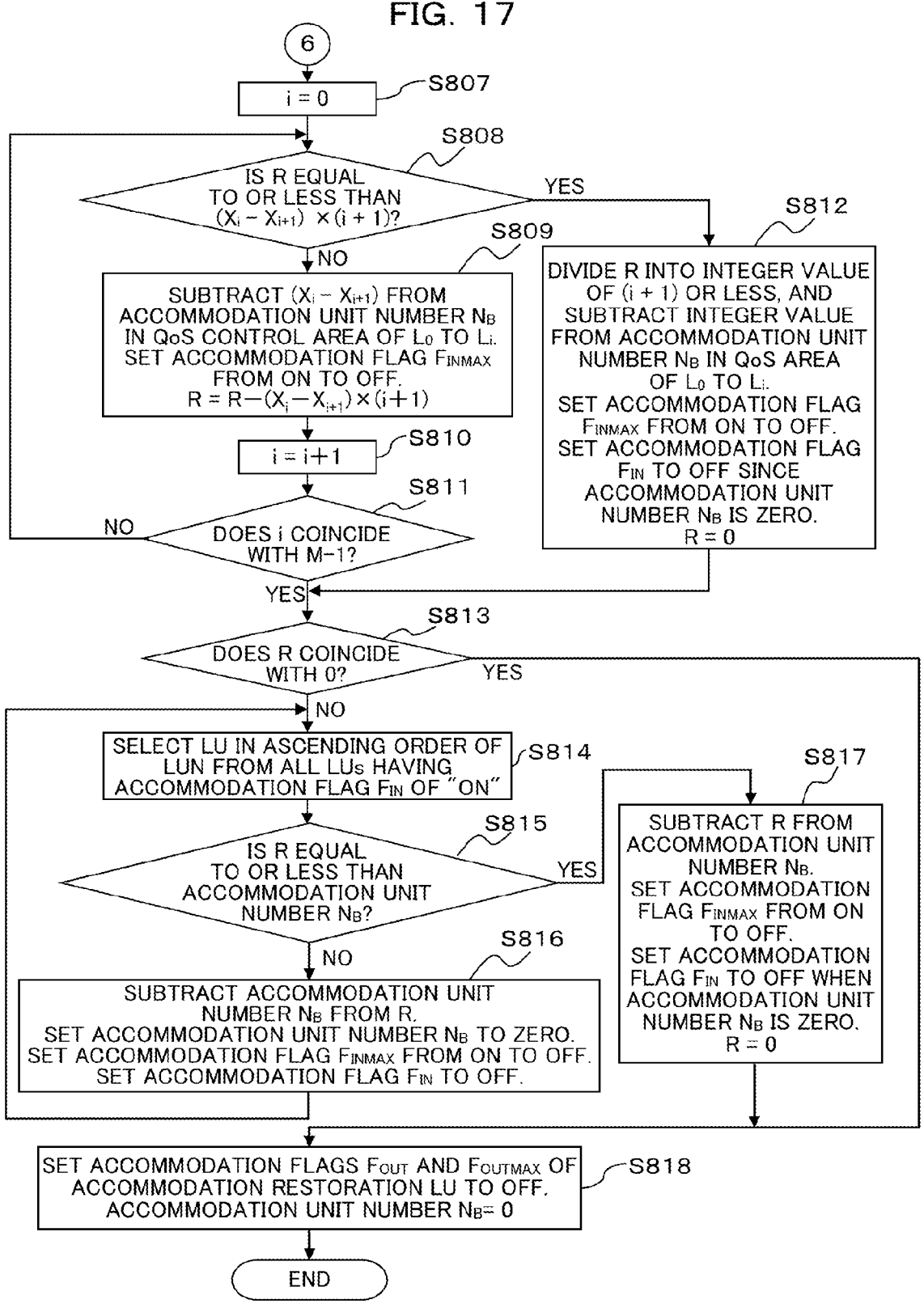

Next, the processing sequence of the macro accommodation restoration process (Step S107 illustrated in FIG. 6) performed by the restoration processing unit 532 according to this embodiment will be described along a flowchart (Steps S801 to S818) illustrated in FIGS. 16 and 17. IN a case where bandwidth insufficiency of a LU accommodating the bandwidth to another LU (Yes route of Step S106 illustrated in FIG. 6) while the N milli-second timer scheduling process illustrated in FIG. 6 is performed every N milli-seconds, the macro accommodation restoration process is performed for returning the bandwidth of the LU to the originally set bandwidth. In other words, in the macro accommodation restoration process, the processing amount accommodated by the accommodation restoration LU to another LU is returned from the accommodation destination LU to the accommodation restoration LU. At that time, the restoration processing unit 532 returns the processing amounts from the accommodation destination LUs to the accommodation restoration LU such that the residual amounts of the processing amounts accommodated to the accommodation destination LUs are uniform or approximately uniform.

The restoration processing unit 532, first, checks whether or not a accommodation restoration LU is present in Step S801. In a case where no accommodation restoration LU is not present (No route of Step S801), the restoration processing unit 532 completes the macro accommodation restoration process.

On the other hand, in a case where a accommodation restoration LU is present (Yes route of Step S801), the restoration processing unit 532, for each LU, performs the following process (Steps S802 to S805). The restoration processing unit 532 determines whether or not the accommodation flag $F_{IN}$ of the target LU is On, in other words, whether or not the target LU is a accommodation destination LU in Step S802.

In a case where the target LU is a accommodation destination LU (Yes route of Step S802), the restoration processing unit 532 inserts the accommodation unit number $N_B$ of the target LU of this time into an appropriate position in the accommodation destination unit array aligned in order of greatest to least accommodation unit numbers $N_B$ in Step S803. In addition, the restoration processing unit 532 also generates an array that associates the LUN specifying the accommodation destination LU and a number specifying the host relating to the accommodation destination LU with each other in Step S804. The accommodation destination unit array including a LU/host number array, for example, is generated inside the QoS control area 213 and stores the LUN specifying the accommodation destination LU and the accommodation unit number $N_B$ of the LU in association with each other. An example of the accommodation destination unit array (LUN/host number array) will be described later with reference to FIG. 18. In addition, the number of elements of the accommodation destination unit array, for example, is 15. In a case where the target is "a combination of a port and a LUN", the restoration processing unit 532, in Step S804, also generates an array associating the LUN specifying the accommodation destination LU and information specifying the port relating to the accommodation destination LU.

After the process of Step S804 or in a case where the target LU is not a accommodation destination LU (No route of Step S802), the restoration processing unit 532 determines whether or not the determination of a accommodation flag $F_I$ has been performed for all the LUs in Step S805. In a case where the determination of a accommodation flag $F_I$ has not been performed for all the LUs (No route of Step S805), the restoration processing unit 532 returns the process to Step S802. On the other hand, in a case where the determination of a accommodation flag $F_I$ has been performed for all the LUs (Yes route of Step S805), the restoration processing unit 532 performs the following process (Steps S806 to S818) while referring to the accommodation destination unit array generated in Steps S803 and S804. Accordingly, the restoration processing unit 532 returns the processing amount from the accommodation destination LUs to the accommodation restoration LU such that the residual amounts of the processing amounts accommodated to the accommodation destination LUs are uniform or approximately uniform.

In performing the following process using the restoration processing unit 532, it is assumed that a unit number (the number of required units) to be recovered to the accommodation restoration LU is A, and the restoration remaining unit number is R. The initial value of the restoration residual unit number R is the required unit number A. In addition, the accommodation destination unit array number (the number of elements of the accommodation destination unit array) is set to M, inter-array unit numbers are set to $X_0$, $X_1$, $X_2$, ..., $X_{M-1}$ (here, $X_0 \geq X_1 \geq X_2 \geq \ldots \geq X_{M-1}$), and inter-array LUs are set to $L_0$, $L_1$, $L_2$, ..., $L_{M-1}$ in Step S806.

Then, the restoration processing unit 532, from i=0 in Step S807, determines whether or not the restoration residual unit number R is $(X_i - X_{i+1}) \times (i+1)$ or less in Step S808. In a case where the restoration residual unit number R is more than $(X_i - X_{i+1}) \times (i+1)$ (No route of Step S808), the restoration processing unit 532 subtracts $(X_i - X_{i+1})$ from the accommodation unit numbers $N_B$ from $L_0$ to $L_i$ of the LUs within the array in the QoS control area 213. At this time, in a case where the accommodation flag $F_{INMAX}$ of each of $L_0$ to $L_i$ is On, the restoration processing unit 532 sets the accommodation flag $F_{INMAX}$ to Off. Then, the restoration processing unit 532 replaces the restoration residual unit number R with $R - (X_i - X_{i+1}) \times (i+1)$ in Step S809. Thereafter, the restoration processing unit 532 increments i to i+1 in Step S810 and determines whether or not i coincides with M−1 in Step S811. In a case where i and M−1 do not coincide with each other (No route of Step S811), the restoration processing unit 532 returns the process to Step S808.

On the other hand, in a case where the restoration residual unit number R is "$(X_i-X_{i+1})\times(i+1)$" or less (Yes route of Step S808), the restoration processing unit 532 performs the following process in Step S812. The restoration processing unit 532 divides the restoration residual unit number R into (i+1) or less integer values. Then, the restoration processing unit 532 subtracts integer values acquired through division from the accommodation unit number $N_B$ of $L_0$ to $L_i$ of the LUs within the array in the QoS control area 213. At this time, in a case where the accommodation flag $F_{INMAX}$ of each of $L_0$ to $L_i$ is On, the restoration processing unit 532 sets the accommodation flag $F_{INMAX}$ to Off. Then, in a case where the accommodation unit number $N_B$ becomes zero in accordance with the subtraction process of the accommodation unit number $N_B$, the restoration processing unit 532 sets the accommodation flag $F_{IN}$ to Off. Then, the restoration processing unit 532 replaces the restoration residual unit number R with zero.

After the process of Step S812 or in a case where i coincides with M−1 (Yes route of Step S811), the restoration processing unit 532 determines whether or not the restoration residual unit number R coincides with zero in Step S813. In a case where the restoration residual unit number R is not zero (No route of Step 5813), the restoration processing unit 532 selects a LU having a newest LUN among all the LUs of which the accommodation flags $F_{IN}$ are On in Step S814. Thereafter, the restoration processing unit 532 determines whether or not the restoration residual unit number R is the accommodation unit number $N_B$ of the selected LU or less in Step S815.

In a case where the restoration residual unit number R is more than the accommodation unit number $N_B$ (No route of Step S815), the restoration processing unit 532 replaces the restoration residual unit number R with a value acquired by subtracting the accommodation unit number $N_B$ from R. In addition, the restoration processing unit 532 sets the accommodation unit number $N_B$ of the selected LU to zero in the QoS control area 213. Furthermore, in a case where the accommodation flag $F_{INMAX}$ of the selected LU is On, the restoration processing unit 532 sets the accommodation flag $F_{INMAX}$ to Off. Then, the restoration processing unit 532 sets the accommodation flag $F_{IN}$ to Off in Step S816.

After the process of Step S816, the restoration processing unit 532, returning the process to Step S814, selects a LU having a next newest LUN among all the LUs of which the accommodation flags $F_{IN}$ are On and performs the same process (Steps S815 and S816).

On the other hand, in a case where the restoration residual unit number R is the accommodation unit number $N_B$ or less (Yes route of Step S815), the restoration processing unit 532 subtracts the restoration residual unit number R from the accommodation unit number $N_B$ of the selected LU in the QoS control area 213. In addition, in a case where the accommodation flag $F_{INMAX}$ of the selected LU is On, the restoration processing unit 532 sets the accommodation flag $F_{INMAX}$ to Off. Furthermore, in a case where the accommodation unit number $N_B$ becomes zero in accordance with the subtraction process of the accommodation unit number $N_B$, the restoration processing unit 532 sets the accommodation flag $F_{IN}$ to Off. Then, the restoration processing unit 532 replaces the restoration residual unit number R with zero in Step S817.

After the process of Step S817 or in a case where the restoration residual unit number R is zero (Yes route of Step S813), the restoration processing unit 532 sets both the accommodation flags $F_{OUT}$ and $F_{OUTMAX}$ of the accommodation restoration LU to Off in the QoS control area 213. In addition, the restoration processing unit 532 sets the accommodation unit number $N_B$ of the accommodation restoration LU to zero in the QoS control area 213 in Step S818. Thereafter, the restoration processing unit 532 completes the macro accommodation restoration process.

Figure 19:
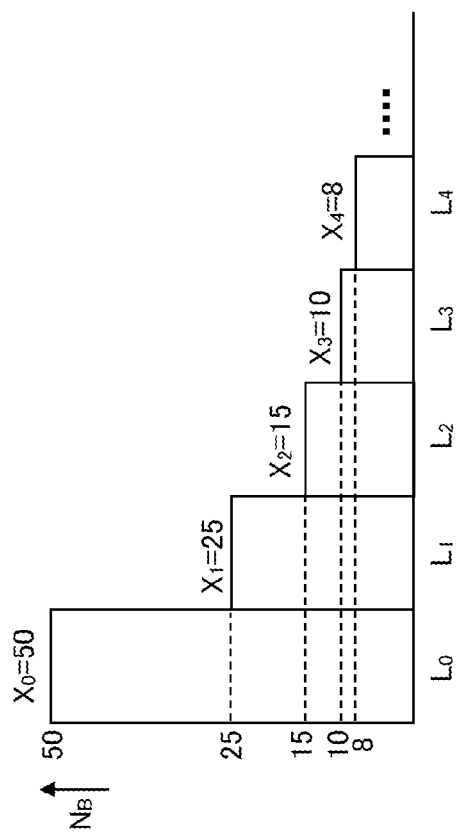
FIGS. 19 and 20 are diagrams that specifically illustrate the macro accommodation restoration process according to this embodiment.
Figure 20:
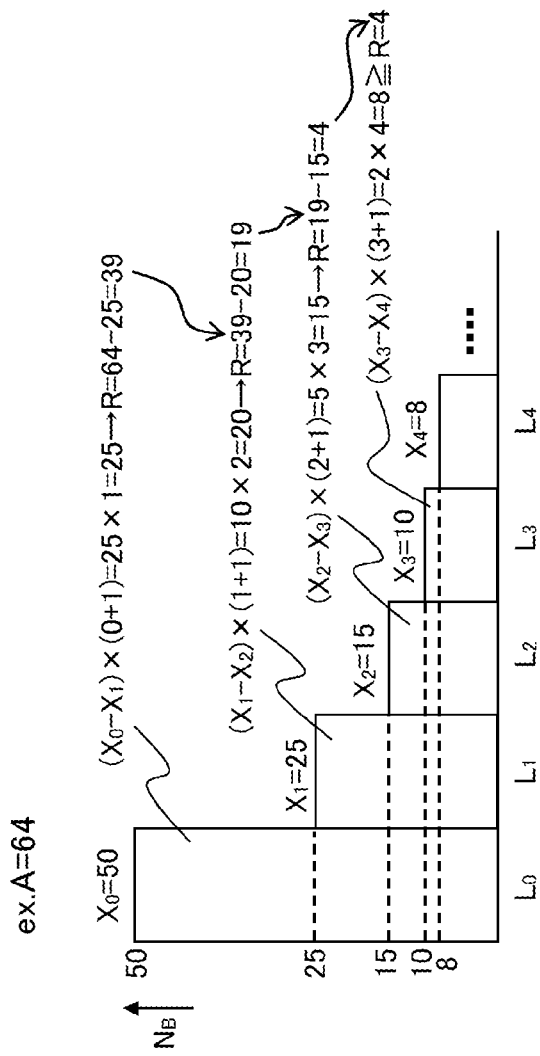

Next, the process of Steps S807 to S813 illustrated in FIG. 17 will be described more specifically with reference to an example illustrated in FIGS. 18 to 20. FIG. 18 is a diagram that illustrates an example of the accommodation destination unit array (LUN/host number array) generated in the macro accommodation restoration process (Steps S803 and S804 illustrated in FIG. 16) according to this embodiment. In addition, FIGS. 19 and 20 are diagrams that specifically illustrate the macro accommodation restoration process (particularly, Steps S807 to S813 illustrated in FIG. 17) according to this embodiment more specifically.

In the accommodation destination unit array illustrated in FIG. 18, a host number and a LUN specifying a "combination of a host and a LUN" and a accommodation unit number $N_B$ of a accommodation destination LU corresponding to the LUN are associated with each other and are sorted in order of greatest to least accommodation unit numbers $N_B$. In the example illustrated in FIGS. 18 and 19, $L_0$ among the LUs within the array corresponds to host #1 and LUN #1, and the accommodation unit number $N_B$ ($=X_0$) of $L_0$ is 50. In addition, $L_1$ among the LUs within the array corresponds to host #2 and LUN #3, and the accommodation unit number $N_B$ ($=X_1$) of $L_1$ is 25, and $L_2$ among the LUs within the array corresponds to host #1 and LUN #4, and the accommodation unit number $N_B$ ($=X_2$) of $L_2$ is 15. Furthermore, $L_3$ among the LUs within the array corresponds to host #2 and LUN #2, and the accommodation unit number $N_B$ ($=X_3$) of $L_3$ is 10, and $L_4$ among the LUs within the array corresponds to host #2 and LUN #5, and the accommodation unit number $N_B$ ($=X_4$) of $L_4$ is 8. Here, the accommodation destination unit array number (the number of elements of the accommodation destination unit array) M is assumed to be 10.

Hereinafter, based on the accommodation destination unit array illustrated in FIGS. 18 and 19, the processing sequence of a case where the restoration processing unit 532 recovers units corresponding to a required unit number A=64 to the accommodation restoration LU will be described more specifically. At this time, the initial value of the restoration residual unit number R is 64 that is the required unit number A. The restoration processing unit 532, after setting i=0 in Step S807, first, calculates the value $(X_i-X_{i+1})\times(i+1)=(X_0-X_1)\times(0+1)=25\times1=25$ at the time of i=0. Since the value of R is 64, R>25 (No route of Step S808), and the restoration processing unit 532 subtracts 25 from the accommodation unit number $N_B$ of $L_0$, so that the bandwidth corresponding to 25 units can be recovered to the accommodation restoration unit from $L_0$. Then, the restoration processing unit 532 changes the value of the restoration residual unit number R from 64 to "64−25"=39 (see Step S809; uppermost equation illustrated in FIG. 20).

Next, the restoration processing unit 532 increments i by one such that i=1 in Step S810. At this time, since i=1≠"M−1"=9 (No route of Step S811), the restoration processing unit 532 returns the process to Step S808 and calculates the value $(X_i-X_{i+1})\times(i+1)=(X_1-X_2)\times(1+1)=10\times2=20$ at the time of i=1. Since the value of R is 39, R>20 (No route of Step S808), and the restoration processing unit 532 subtracts 10 respectively from the accommodation unit numbers $N_B$ of $L_0$ and $L_1$, so that the bandwidth corresponding to 20 units can be recovered to the accommodation restoration unit from $L_0$ and L. Then, the restoration processing unit 532 changes the value of the restoration residual unit number R from 39 to "39−20"=19 (see Step S809; second equation from the top in FIG. 20).

Next, the restoration processing unit 532 increments i by one such that i=2 in Step S810. At this time, since i=2≠"M−1"=9 (No route of Step S811), the restoration processing unit 532 returns the process to Step S808 and calculates the value $(X_i-X_{i+1})\times(i+1)=(X_2-X_2)\times(2+1)=5\times3=15$ at the time of i=2. Since the value of R is 19, R>15 (No route of Step S808), and the restoration processing unit 532 subtracts 5 respectively from the accommodation unit numbers $N_B$ of $L_0$, $L_1$, and $L_2$, so that the bandwidth corresponding to 15 units can be recovered to the accommodation restoration unit from $L_0$, $L_1$, and $L_2$. Then, the restoration processing unit 532 changes the value of the restoration residual unit number R from 19 to "19−15"=4 (see Step S809; third equation from the top in FIG. 20).

Next, the restoration processing unit 532 increments i by one such that i=3 in Step S810. At this time, since i=3≠"M−1"=9 (No route of Step S811), the restoration processing unit 532 returns the process to Step S808 and calculates the value $(X_i-X_{i+1})\times(i+1)=(X_2-X_4)\times(3+1)=2\times4=8$ at the time of i=3. Since the value of R is 4, R≤8 (Yes route of Step S808; see fourth equation from the top in FIG. 20), and the restoration processing unit 532 divides the restoration residual unit number R=4 into (i+1)=4 or less integer values. Here, R=4 is divided into four LUs of $L_0$ to $L_3$, and the restoration processing unit 532 subtracts 1 respectively from the accommodation unit numbers $N_B$ four LUs of $L_0$ to $L_3$ and changes the value of the restoration residual unit number R from 4 to 0 in Step S812. At this time, since R=0 (Yes route of Step S813), the restoration processing unit 532 proceeds to the process of Step S818.

Through the above-described process, the bandwidth (processing amount) accommodated from the accommodation restoration LU to other LUs is recovered from the accommodation destination LU to the accommodation restoration LU. At that time, the bandwidth can be returned to the accommodation restoration LU from the accommodation destination LUs such that the residual amounts of the bandwidth (processing amount) accommodated to the accommodation destination LUs are uniform or approximately uniform.

[3] Advantages of this Embodiment

According to the storage apparatus 100 of this embodiment, by distributing the bandwidth of the storage apparatus 100 in accordance with the bandwidth level (the priority level) of a combination of a used host and a LU, the QoS function of the storage can be easily realized.

In addition, according to the storage apparatus 100 of this embodiment, the storage bandwidth can be optimally controlled in accordance with the status of input/output requests (I/O requests or commands) from the host 10 or a change in the connection environment of the host 10. Particularly, in the macro bandwidth accommodation of this embodiment, the bandwidth accommodation is performed with minimum intervals of 5 MB/s and 60 IOPS of the bandwidth value with respect to the priority level being used as "one unit". Accordingly, the change interval (accommodation amount) of the bandwidth limit can be configured to be markedly smaller than that of a case where the bandwidth limit is changed by changing the priority level, and a change in the processing bandwidth requested from the host 10 can be delicately followed, whereby various bandwidth changes can be responded. At that time, since the bandwidth is accommodated from a LU having room for the processing bandwidth to spare to a LU having bandwidth insufficiency among a plurality of volumes (LUs), the bandwidth accommodation can be reliably performed.

Furthermore, in the storage apparatus 100 of this embodiment, based on the characteristics of the micro bandwidth accommodation and the macro bandwidth accommodation, any one of the micro bandwidth accommodation and the macro bandwidth accommodation is used. In a case where any one of the micro bandwidth accommodation and the macro bandwidth accommodation is used, appropriate bandwidth accommodation can be selected in accordance with the operating environment using the storage QoS of the storage apparatus 100. In addition, in a case where both thereof are used, by performing control such that the micro bandwidth accommodation is used for absorbing a temporary spike bandwidth and the like, and the macro bandwidth accommodation is used for absorbing continuous bandwidth variations, the characteristics of both thereof can be effectively utilized.

In addition, in the micro bandwidth accommodation of this embodiment, the processing bandwidth is accommodated to a LU having processing bandwidth insufficiency from a LU having room for the processing bandwidth to spare at a micro cycle, for example, of one second or less. The accommodation amount at that time is neither stored nor reflected on the adjustment of the bandwidth limit at the next micro cycle. Accordingly, the storage apparatus 100 operates with the original processing bandwidth at the next micro cycle. In this way, since the micro bandwidth accommodation is temporary accommodation, by using the micro bandwidth accommodation, a large amount of bandwidth accommodation can be performed at a time.

Furthermore, in the macro bandwidth accommodation of this embodiment, the processing bandwidth is monitored at a longer macro cycle, for example, of two seconds or more. Then, the processing bandwidth is accommodated to a LU having bandwidth insufficiency continuously for a predetermined time (for example, one macro cycle) from a LU having room for the processing bandwidth to spare continuously for the predetermined time. In this way, since the bandwidth accommodation amount is adjusted through learning in the macro bandwidth accommodation, continuous variations in the processing bandwidth requested from the host 10 can be effectively responded.

In addition, according to the storage apparatus 100 of this embodiment, in a case where the insufficiency in the processing bandwidth occurs in the accommodation source LU, in other words, in a case where a accommodation restoration LU is present, the bandwidth (processing amount) accommodated from the accommodation restoration LU to other LUs is returned from the accommodation destination LU to the accommodation restoration LU. At that time, the bandwidth can be returned from the accommodation destination LUs to the accommodation restoration LU such that the residual amounts of the bandwidth (processing amounts) accommodated to the accommodation destination LUs are uniform or approximately uniform. In other words, the accommodation amounts in a plurality of accommodation destination LUs after the bandwidth restoration of the accommodation restoration LU can be configured to remain uniformly or approximately uniformly, whereby a deviation of the accommodation amounts in the plurality of accommodation destination LUs disappears. Accordingly, in the storage apparatus 100 including the plurality of accommodation destination LUs, subsequent processes can be effectively performed.

[4] Others

While the preferred embodiment of the present invention has been described in detail, the present invention is not limited to the embodiment described above, but various changes and modifications can be made therein in a range not departing from the concept of the present invention.

In addition, each constituent unit illustrated in the figure is a functional and conceptual unit and thus, is not necessarily required to be physically configured as illustrated in the figures. For example, in the SCSI target control unit 303, the command reception unit 504 and the scheduling unit 506 may be integrated together. In addition, the whole or an arbitrary part of each processing function performed in each device may be realized by a CPU and a program that is interpreted and executed by the CPU or may be realized by hardware using wired logic.

Figure 21:
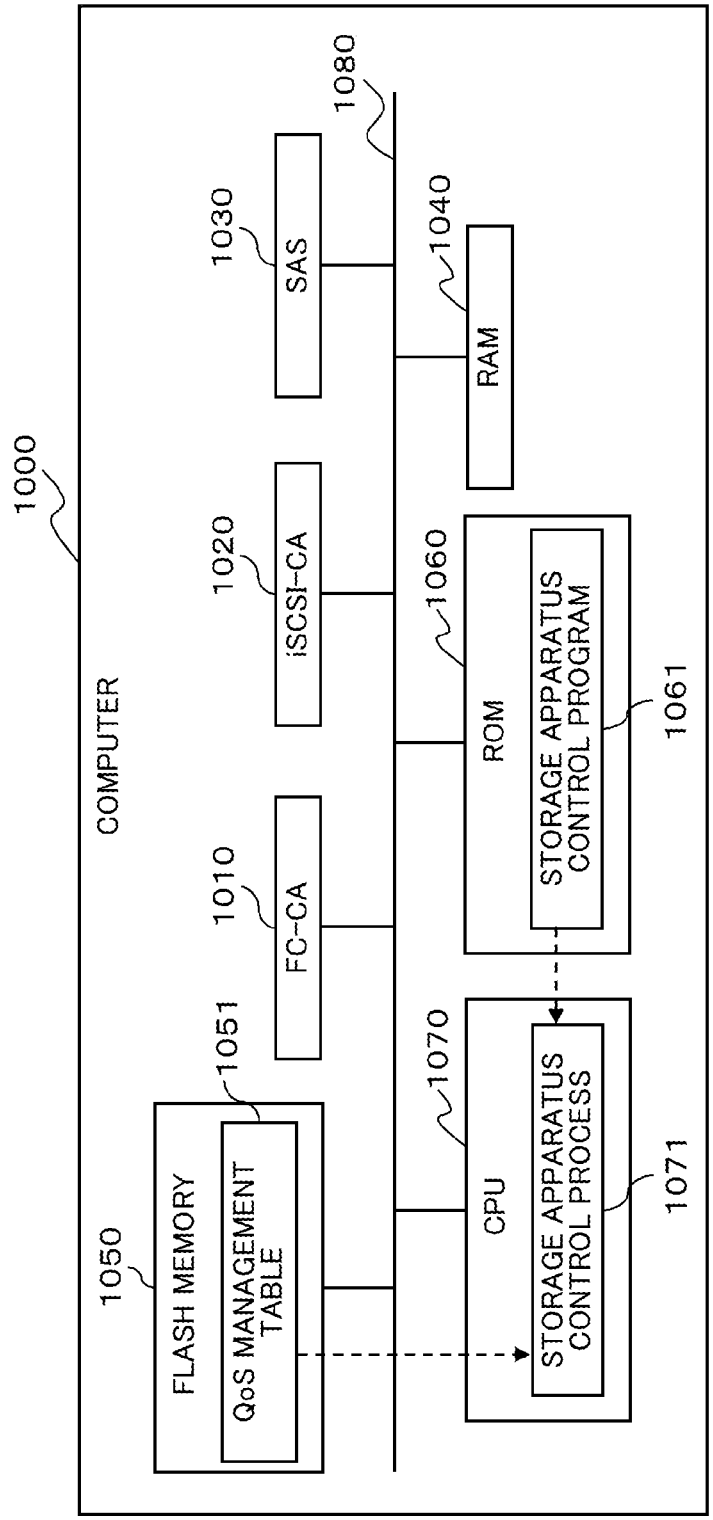
FIG. 21 is a block diagram that illustrates a computer executing a storage apparatus control program according to this embodiment.

Furthermore, various processes described in this embodiment may be realized by executing a program prepared in advance using a computer included in the storage apparatus. Thus, hereinafter, an example of a computer executing a storage apparatus control program having the same function as this embodiment will be described with reference to FIG. 21. FIG. 21 is a block diagram that illustrates a computer executing the storage apparatus control program according to this embodiment.

As illustrated in FIG. 21, the computer 1000 includes an FC-CA 1010 that is an interface for a host, an iSCSI-CA 1020 that is an interface for a host, and an SAS 1030 that is an interface for a disk device. In addition, the computer 1000 includes a RAM 1040 that temporarily stores various kinds of information and a rewritable non-volatile flash memory 1050 in which data does not disappear even when the power is turned off. Furthermore, the computer 1000 includes a read only memory (ROM) 1060 that is a reading-dedicated memory and a CPU 1070 that performs various calculation processes. Here, the units included in the computer 1000 are interconnected through a bus 1080.

In the flash memory 1050, a QoS management table 1051 corresponding to the QoS management table 501 illustrated in FIGS. 3 and 5, the bandwidth accommodation information of each LU illustrated in FIG. 3, and the like are stored. In addition, in the ROM 1060, a storage apparatus control program 1061 having functions similar to those of the calculation unit 505, the scheduling unit 506, the execution unit 507, the macro accommodation checking unit 510, the macro accommodation processing unit 520, the macro accommodation restoration processing unit 530, and the micro accommodation processing unit 540 illustrated in FIG. 3 is stored.

Then, the CPU 1070 executes the storage apparatus control program 1061 read from the ROM 1060 as a storage apparatus control process 1071 by referring to the QoS management table 1051 or the bandwidth accommodation information of each LU read from the flash memory 1050.

In addition, the above-described storage apparatus control program 1061 is not necessarily required to be stored in the ROM 1060. For example, the storage apparatus control program 1061 may be provided in a form being recorded in a computer-readable recording medium such as a flexible disk, a CD (a CD-ROM, a CD-R, a CD-RW, or the like), a DVD (a DVD-ROM, a DVD-RAM, a DVD-R, a DVD-RW, a DVD+R, a DVD+RW, or the like), or a Blue-ray disc. In such a case, the computer 1000 reads the storage apparatus control program 1061 from the recording medium and transmits the program to an internal storage device or an external storage device so as to be stored therein and used. Furthermore, this storage apparatus control program 1061 may be stored in another computer (or a server) connected to the computer 1000 through a public line, the Internet, a local area network (LAN), a wide area network (WAN), or the like, and the storage apparatus control program 1061 may be configured to be read therefrom and executed by the computer 1000.

According to an embodiment, various bandwidth variations can be responded.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage apparatus comprising:
a plurality of storage devices; and
a storage control device that comprises a processor and controls the plurality of storage devices using the processor, wherein
the processor
calculates an upper limit of an input/output processing amount, which is determined based on priority levels set to the plurality of storage devices, for each of the storage devices;
schedules an execution sequence of processes relating to input/output requests received from information processing apparatuses, based on processing amounts relating to the input/output requests and the calculated upper limits;
executes the processes relating to the input/output requests in the scheduled execution sequence;
determines, for each of the storage devices, whether or not a processing amount relating to the input/output requests for the each of the storage devices exceeds a processing bandwidth of the each of the storage devices during a first predetermined time; and
changes the upper limit for the each of the storage devices in a predetermined bandwidth accommodation unit in a case where the processing amount relating to the input/output requests for the each of the storage devices is determined to exceed the processing bandwidth of the each of the storage devices during the first predetermined time.

2. The storage apparatus according to claim 1, the processor determines, for the each of the storage devices, whether or not the processing amount relating to the input/output requests for the each of the storage devices is below the processing bandwidth of the each of the storage devices during a second predetermined time, and
in a case where a processing amount relating to the input/output requests for a first storage device among the plurality of the storage devices is determined to exceed the processing bandwidth of the first storage device during the first predetermined time, and a processing amount relating to the input/output requests for a second storage device among the plurality of the storage devices is determined to be below the processing bandwidth of the second storage device during the second predetermined time, the processor performs bandwidth accommodation from the second storage device to the first storage device in the predetermined bandwidth accommodation unit by changing the upper limits in the predetermined bandwidth accommodation unit.

3. The storage apparatus according to claim 2, wherein the processor performs the bandwidth accommodation from the second storage device to the first storage device in the predetermined bandwidth accommodation unit by changing the upper limits such that a value corresponding to the predetermined bandwidth accommodation unit is added to the upper limit calculated for the first storage device, and such that the value corresponding to the predetermined bandwidth accommodation unit is subtracted from the upper limit calculated for the second storage device.

4. The storage apparatus according to claim 3, wherein the value corresponding to the predetermined bandwidth accommodation unit is equal to or less than a minimum interval of the input/output processing amount that is determined based on the priority levels.

5. The storage apparatus according to claim 2, the processor acquires, for the each of the storage devices, a processing standby amount of the input/output requests for the each of the storage devices at an interval shorter than the first predetermined time and acquire a minimum of the processing standby amounts acquired within the first predetermined time as a minimum standby amount, and
the processor determines that the processing amount relating to the input/output requests for the first storage device exceeds the processing bandwidth of the first storage device during the first predetermined time in a case where the acquired minimum standby amount for the first storage device is non-zero.

6. The storage apparatus according to claim 5, wherein the processor acquires, as the minimum standby amount, a minimum standby unit number acquired by converting the minimum standby amount into the predetermined bandwidth accommodation unit.

7. The storage apparatus according to claim 2, the processor acquires, for each of the storage devices, a residual processing amount of the processing amount relating to the input/output requests for the each of the storage devices with respect to the processing bandwidth of the each of the storage devices at an interval shorter than the second predetermined time and acquire a minimum of the residual processing amounts acquired within the second predetermined time as a minimum residual amount, and
the processor determines that the processing amount relating to the input/output requests for the second storage device is below the processing bandwidth of the second storage device during the second predetermined time in a case where the acquired minimum residual amount is non-zero.

8. The storage apparatus according to claim 7, wherein the processor acquires, as the minimum residual amount, a minimum residual unit number acquired by converting the minimum residual amount into the predetermined bandwidth accommodation unit.

9. The storage apparatus according to claim 2, the processor determines, for each of the storage devices, whether or not the each of the storage devices is the second storage device performing the bandwidth accommodation for one or more of the first storage devices and is a accommodation restoration target for which processing standby for the input/output requests for the each of the storage devices occurs; and
the processor returns, in a case where the each of the storage devices is determined as the accommodation restoration target, a processing amount accommodated to the other storage devices by the storage device that is the accommodation restoration target from the one or more of the first storage devices to the storage device that is the accommodation restoration target.

10. The storage apparatus according to claim 9, wherein the processor returns the processing amount from the one or more of the first storage devices to the storage device that is the accommodation restoration target such that residual amounts of the processing amounts accommodated to the one or more of the first storage devices are equal or approximately equal.

11. The storage apparatus according to claim 1, the processor determines, for each of the storage devices, whether or not the processing amount relating to the input/output requests for the each of the storage devices is a multiple of a predetermined number or more of the processing bandwidth of the each of the storage devices; and
the processor performs, in a case where the processing amount relating to the input/output requests for each of the storage devices is determined to be the multiple of the predetermined number or more of the processing bandwidth of the each of the storage devices, bandwidth accommodation to the each of the storage devices from the storage device having a bandwidth to spare over the processing amount relating to the input/output requests for the each of the storage devices.

12. The storage apparatus according to claim 1, wherein each of the plurality of storage devices is one of a plurality of logical units acquired by logically dividing one or more physical storage devices.

13. A method of controlling a storage apparatus causing the storage apparatus to perform:
calculating an upper limit of an input/output processing amount, which is determined based on priority levels set to a plurality of storage devices, for each of the storage devices;
scheduling an execution sequence of processes relating to input/output requests received from information processing apparatuses, based on processing amounts relating to the input/output requests and the calculated upper limits;
executing the processes relating to the input/output requests in the scheduled execution sequence;
determining, for each of the storage devices, whether or not a processing amount relating to the input/output requests for the each of the storage devices exceeds a processing bandwidth of the each of the storage devices during a first predetermined time; and
changing the upper limit for the each of the storage devices in a predetermined bandwidth accommodation unit in a case where the processing amount relating to the input/output requests for the each of the storage devices is determined to exceed the processing bandwidth of the each of the storage devices during the first predetermined time.

14. The method of controlling the storage apparatus according to claim 13, wherein the storage apparatus is caused to further perform:
determining, for the each of the storage devices, whether or not the processing amount relating to the input/output requests for the each of the storage devices is below the processing bandwidth of the each of the storage devices during a second predetermined time; and performing bandwidth accommodation, in a case where a processing amount relating to the input/output requests for a first storage device among the plurality of the storage devices is determined to exceed the processing bandwidth of the first storage device during the first predetermined time, and a processing amount relating to the input/output requests for a second storage device among the plurality of the storage devices is determined to be below the processing bandwidth of the second storage device during the second predetermined time, from the second storage device to the first storage device in the predetermined bandwidth accommodation unit by changing the upper limits in the predetermined bandwidth accommodation unit.

15. The method of controlling the storage apparatus according to claim 14, wherein the storage apparatus is caused to further perform the bandwidth accommodation from the second storage device to the first storage device in the predetermined bandwidth accommodation unit by changing the upper limits such that a value corresponding to the predetermined bandwidth accommodation unit is added to the upper limit calculated for the first storage device, and such that the value corresponding to the predetermined bandwidth accommodation unit is subtracted from the upper limit calculated for the second storage device.

16. The method of controlling the storage apparatus according to claim 15, wherein the value corresponding to the predetermined bandwidth accommodation unit is equal to or less than a minimum interval of the input/output processing amount that is determined based on the priority levels.

17. A non-transitory computer-readable recording medium having stored therein a storage apparatus control program for causing a computer included in the storage apparatus to execute a process comprising:
calculating an upper limit of an input/output processing amount, which is determined based on priority levels set to a plurality of storage devices, for each of the storage devices;
scheduling an execution sequence of processes relating to input/output requests received from information processing apparatuses, based on processing amounts relating to the input/output requests and the calculated upper limits;
executing the processes relating to the input/output requests in the scheduled execution sequence;
determining, for each of the storage devices, whether or not a processing amount relating to the input/output requests for the each of the storage devices exceeds a processing bandwidth of the each of the storage devices during a first predetermined time; and
changing the upper limit for the each of the storage devices in a predetermined bandwidth accommodation unit in a case where the processing amount relating to the input/output requests for the each of the storage devices is determined to exceed the processing bandwidth of the each of the storage devices during the first predetermined time.

18. The non-transitory computer-readable recording medium having stored therein a storage apparatus control program according to claim 17, wherein the process further comprising:
determining, for the each of the storage devices, whether or not the processing amount relating to the input/output requests for the each of the storage devices is below the processing bandwidth of the each of the storage devices during a second predetermined time; and
performing bandwidth accommodation, in a case where a processing amount relating to the input/output requests for a first storage device among the plurality of the storage devices is determined to exceed the processing bandwidth of the first storage device during the first predetermined time, and a processing amount relating to the input/output requests for a second storage device among the plurality of the storage devices is determined to be below the processing bandwidth of the second storage device during the second predetermined time, from the second storage device to the first storage device in the predetermined bandwidth accommodation unit by changing the upper limits in the predetermined bandwidth accommodation unit.

19. The non-transitory computer-readable recording medium having stored therein a storage apparatus control program according to claim 18, wherein the process further comprises performing the bandwidth accommodation from the second storage device to the first storage device in the predetermined bandwidth accommodation unit by changing the upper limits such that a value corresponding to the predetermined bandwidth accommodation unit is added to the upper limit calculated for the first storage device, and such that the value corresponding to the predetermined bandwidth accommodation unit is subtracted from the upper limit calculated for the second storage device.

20. The non-transitory computer-readable recording medium having stored therein a storage apparatus control program according to claim 19, wherein the value corresponding to the predetermined bandwidth accommodation unit is equal to or less than a minimum interval of the input/output processing amount that is determined based on the priority levels.

* * * * *